United States Patent
Takahashi

(10) Patent No.: US 10,620,762 B2
(45) Date of Patent: Apr. 14, 2020

(54) INPUT DEVICE, CONTROL METHOD FOR INPUT DEVICE, AND NON-TRANSITORY COMPUTER READABLE STORAGE MEDIUM STORING INPUT DEVICE CONTROL PROGRAM

(71) Applicant: ALPS ALPINE CO., LTD., Tokyo (JP)

(72) Inventor: Akihiro Takahashi, Milton Keynes (GB)

(73) Assignee: ALPS ALPINE CO., LTD., Tokyo (JP)

( * ) Notice: Subject to any disclaimer, the term of this patent is extended or adjusted under 35 U.S.C. 154(b) by 104 days.

(21) Appl. No.: 15/946,933

(22) Filed: Apr. 6, 2018

(65) Prior Publication Data
US 2018/0224977 A1 Aug. 9, 2018

Related U.S. Application Data

(63) Continuation of application No. PCT/JP2016/080563, filed on Oct. 14, 2016.

(30) Foreign Application Priority Data

Oct. 19, 2015 (JP) .................................. 2015-205935

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0416* (2013.01); *G06F 2203/04101* (2013.01); *G06F 2203/04111* (2013.01)

(58) Field of Classification Search
CPC ................... G06F 3/044; G06F 3/0416; G06F 2203/04101; G06F 2203/04111; G06F 2203/041; G06F 3/0412
See application file for complete search history.

(56) References Cited

U.S. PATENT DOCUMENTS

2011/0242050 A1  10/2011  Byun et al.
2013/0147755 A1   6/2013  Lin et al.
(Continued)

FOREIGN PATENT DOCUMENTS

JP   2013-020479   1/2013
JP   2014-010505   1/2014
(Continued)

OTHER PUBLICATIONS

Extended European Search Report for 16857376.4 dated Oct. 9, 2018.
(Continued)

*Primary Examiner* — Md Saiful A Siddiqui
(74) *Attorney, Agent, or Firm* — IPUSA, PLLC

(57) ABSTRACT

An input device includes a driver that supplies drive signals to a plurality of capacitive elements, respectively; a charge detector that detects a change in an electric charge corresponding to the drive signal in each of the plurality of capacitive elements; a capacitive element identifier that identifies the capacitive element to which an object approaches based on a detection result by the charge detector; an electric field generator that generates an electric field for reducing another electric field generated as an electric charge changes in the capacitive element when the driver supplies the drive signal to the capacitive element; and a controller that adjusts the electric field generated by the electric field generator depending on whether the capacitive element to which the driver supplies the drive signal includes the capacitive element identified by the capacitive element identifier.

14 Claims, 9 Drawing Sheets

(56) References Cited

U.S. PATENT DOCUMENTS

| | | | | |
|---|---|---|---|---|
| 2014/0028625 A1* | 1/2014 | Maeda | .................... | G06F 3/044 345/174 |
| 2014/0192015 A1* | 7/2014 | Yamaguchi | ........... | G06F 3/0416 345/174 |
| 2016/0041645 A1* | 2/2016 | Ray | ........................ | G06F 3/044 345/174 |

FOREIGN PATENT DOCUMENTS

| | | |
|---|---|---|
| JP | 2014-132415 | 7/2014 |
| WO | 2012/027754 | 3/2012 |

OTHER PUBLICATIONS

International Search Report dated Jan. 24, 2017 in PCT/JP2016/080563 filed on Oct. 14, 2016.

* cited by examiner

INPUT DEVICE, CONTROL METHOD FOR INPUT DEVICE, AND NON-TRANSITORY COMPUTER READABLE STORAGE MEDIUM STORING INPUT DEVICE CONTROL PROGRAM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/080563 filed on Oct. 14, 2016, designating the U.S., which claims priority based on Japanese Patent Application No. 2015-205935 filed on Oct. 19, 2015. The entire contents of each of the foregoing applications are incorporated herein by reference.

BACKGROUND

Technical Field

The present disclosure relates to an input device, a control method for an input device, and a non-transitory computer readable storage medium storing an input device control program.

Description of Related Art

There is an input device that performs input by detecting approach of an object based on a change in electrostatic capacitance. The input device forms a capacitive element for detecting the electrostatic capacitance by a plurality of drive electrodes and a plurality of detection electrodes. The electrostatic capacitance of the capacitive element is detected while changing drive signals of the plurality of drive electrodes. In response to the drive signals, radiation noise occurs. As a method of reducing the radiation noise as a whole in the vicinity of the input device, there is a method of applying a signal with a phase that is opposite to that of the drive signal, as in Patent Document 1 (Japanese Unexamined Patent Publication No. 2014-132415).

In a state in which an object, such as a finger, does not approach a capacitive element, radiation noise can be effectively reduced by a predetermined signal. However, as the object approaches the capacitive element, the radiation noise from the drive electrodes and the detection electrodes is absorbed by the object, so that there is a disadvantage that the balance of the radiation noise in the vicinity of the input device is lost.

There is a need for an input device, a control method for an input device, and an input device control program that can maintain balance of radiation noise in the vicinity of the input device, even if the object approaches.

SUMMARY

A first aspect of the present disclosure relates to an input device for inputting information corresponding to approach of an object. The input device includes a plurality of capacitive elements such that, for each of the plurality of capacitive elements, electrostatic capacitance changes in response to approach of an object; a driver that supplies drive signals to the plurality of capacitive elements, respectively; a charge detector that detects a change in an electric charge corresponding to the drive signal in each of the plurality of capacitive elements; a capacitive element identifier that identifies the capacitive element to which the object approaches based on a detection result by the charge detector; an electric field generator that generates an electric field for reducing another electric field generated as an electric charge changes in at least in one capacitive element when the driver supplies the drive signal to the at least one capacitive element; and a controller that adjusts the electric field generated by the electric field generator depending on whether the at least one capacitive element to which the driver supplies the drive signal includes the capacitive element identified by the capacitive element identifier.

According to this configuration, the electric field generated by the electric field generator is adjusted depending on whether the at least one capacitive element to which the driver supplies the drive signal includes a capacitive element to which the object approaches. As a result, even if the object approaches the capacitive element, the balance of the radiation noise in the vicinity of the input device can be maintained.

Preferably, the input device according to the first aspect of the present disclosure may include a selector that selects, as the electric field generator for which the electric field is to be adjusted by the controller, at least one capacitive element of the plurality of capacitive elements that is different from the capacitive element identified by the capacitive element identifier, if the plurality of capacitive elements includes the capacitive element identified by the capacitive element identifier when the driver supplies the drive signals to the plurality of capacitive elements. The controller may adjust a charge amount, which varies as the drive signal is supplied, of the capacitive element in a state in which the object is not in proximity that is different from the capacitive element identified by the capacitive element identifier, depending on whether the selector selects the capacitive element in the state in which the object does not approach.

According to this configuration, as the electric field of the capacitive element that functions as the electric field generator is adjusted, the configuration can be simplified compared to a case in which a dedicated configuration is provided as the electric field generator.

Preferably, the driver may be capable of changing a polarity of the change in the electric charge in the capacitive element, depending on the drive signal. The selector may select, as the electric field generator for which the electric field is to be adjusted by the controller, at least one capacitive element in the state in which the object does not approach and the electric charge varies in a polarity opposite to a polarity of the capacitive element identified by the capacitive element identifier. When the selector selects the capacitive element in the state in which the object does not approach, the controller may cause the charge amount in the capacitive element in the state in which the object does not approach, which varies as the drive signal is supplied, to be smaller, compared to a case in which the selector does not select the capacitive element in the state in which the object does not approach.

Preferably, the controller may adjust at least one of the electrostatic capacitance of the capacitive element in the state in which the object does not approach and a level of the drive signal supplied to the capacitive element in the state in which the object does not approach, depending on whether the selector selects the capacitive element in the state in which the object does not approach.

Preferably, the input device according to the first aspect of the present disclosure may include a plurality of detection electrodes and a plurality of drive electrodes that intersects the plurality of detection electrodes. Each capacitive element may be formed at an intersection between one detection electrode and one drive electrode. The driver may supply the drive signals to the plurality of drive electrodes, respectively. The charge detector may generate, for each of the plurality of detection electrodes, a detection signal corresponding to a sum of changes in the electric charges in the plurality of capacitive elements formed in a common detection electrode. The capacitive element identifier may identify the capacitive element to which the object approaches, based on the plurality of detection signals generated for the plurality of detection electrodes in the charge detector. When the driver supplies the drive signal to at least one drive electrode, the electric field generator may generate an electric field for reducing an electric field that occurs with the changes in the electric charges in the plurality of capacitive elements formed in at least one drive electrode. The controller may adjust the electric field generated by the electric field generator depending on whether the plurality of capacitive elements formed in at least one drive electrode to which the driver supplies the drive signal includes the capacitive element identified by the capacitive element identifier.

Preferably, the input device according to the first aspect of the present disclosure may include the selector that select, as the electric field generator for which the electric field is to be adjusted by the controller, at least one capacitive element that is formed in the drive electrode that is different from the drive electrode in which the capacitive element of the plurality of capacitive elements identified by the capacitive element identifier is formed and that is formed in the detection electrode that is different from the detection electrode in which the capacitive element identified by the capacitive element identifier is formed, if the plurality of capacitive elements formed in the plurality of drive electrodes include the capacitive element identified by the capacitive element identifier when the driver supplies the drive signals to the plurality of drive electrodes. The controller may adjust the charge amount that varies as the drive signal is supplied in the capacitive element in the state in which the object does not approach that is the capacitive element that is different from the capacitive element identified by the capacitive element identifier, depending on whether the selector selects the capacitive element in the state in which the object does not approach.

Preferably, each drive electrode may be divided into a plurality of partial drive electrodes. The driver may be capable of supplying the drive signal to each partial drive electrode. The controller may supply a common drive signal to the plurality of partial drive electrodes for the drive electrode in which the capacitive element selected by the selector is not formed; and the controller may supply different drive signals to a part of the plurality of partial drive electrodes that forms the selected capacitive element and to another part of the partial drive electrodes, respectively, for the drive electrode in which the capacitive element selected by the selector is formed.

Preferably, the driver may be capable of changing the polarity of the change in the electric charge in the capacitive element, depending on the drive signal. The selector may select, as the electric field generator for which the electric field is to be adjusted by the controller, at least one capacitive element in the state in which the object does not approach: that is formed in the drive electrode that is different from the drive element in which the capacitive element identified by the capacitive element identifier is formed; that is formed in the detection electrode that is different from the detection electrode in which the capacitive element identified by the capacitive element identifier is formed; and for which the electric charge varies in a polarity opposite to that of the capacitive element identified by the capacitive element identifier. The controller may cause a level of the drive signal supplied to the part of the partial drive electrodes of the plurality of partial drive electrodes that forms the selected capacitive element to be smaller than that of the drive signal supplied to the other part of the partial drive electrodes, for the drive electrode in which the capacitive element selected by the selector is formed.

Preferably, in the input device according to the first aspect of the present disclosure, each of the one or more capacitive elements may be formed by two or more partial drive electrodes.

Preferably, the controller may cause the level of the drive signal to be supplied to the one or more partial drive electrodes forming the capacitive element selected by the selector to be approximately zero when the at least one of the capacitive element selected by the selector is the capacitive element formed by the two or more partial drive electrodes.

Preferably, for detecting the electric charges of the plurality of capacitive elements belonging to one detection electrode, the capacitive element identifier may control the drive signal so that the electric charge of one capacitive element is detected by the charge detector at one time.

Preferably, the driver may be capable of selecting, as the polarity of the drive signal, causing the drive signal to have a signal level with a predetermined absolute value for accumulating a positive polarity charge in the capacitive element; causing the drive signal to have the signal level with a predetermined absolute value for accumulating a negative polarity charge in the capacitive element; and causing the level of the drive signal to be zero. The charge detector may generate the detection signal corresponding to the sum of the electric charge signals generated as the drive signal is supplied to each of the plurality of capacitive elements formed in the detection electrode. The capacitive element identifier may obtain, while changing the polarity pattern that is a combination of the polarities in the plurality of drive signals simultaneously supplied to the plurality of drive electrode into a plurality of patterns, the detection signals of the identical detection electrode generated, for each of the polarity patterns, by the charge detector; and the capacitive element identifier may calculate, based on the plurality of polarity patterns and the detection signals obtained in a number that is the same as that of the polarity patterns for one of the detection electrodes, electrostatic capacitance detection values of the plurality of capacitive elements formed in the one detection electrode.

A second aspect of the present disclosure relates to a control method for an input device for inputting information corresponding to approach of an object, the input device including a plurality of capacitive elements such that, for each of the plurality of capacitive elements, electrostatic capacitance changes in response to approach of an object; a driver that supplies drive signals to the plurality of capacitive elements, respectively; a charge detector that detects a change in an electric charge corresponding to the drive signal in each of the plurality of capacitive elements; and an electric field generator that generates an electric field for reducing another electric field generated as an electric charge changes in at least in one capacitive element when the driver supplies the drive signal to the at least one capacitive element. The control method for the input device includes identifying the capacitive element to which the object approaches based on a detection result by the charge detector; and adjusting the electric field generated by the electric field generator depending on whether the at least one capacitive element to which the driver supplies the drive signal includes the identified capacitive element.

According to this configuration, the electric field generated by the electric field generator is adjusted depending on whether the at least one capacitive element to which the driver supplies the drive signal includes the capacitive element to which the object approaches. As a result, even if the object approaches the capacitive element, the balance of the radiation noise in the vicinity of the input device can be maintained.

A third aspect of the present disclosure is a non-transitory computer readable storage medium storing an input device control program that causes a computer to execute a control method for the input device for inputting information corresponding to approach of an object, the input device including a plurality of capacitive elements such that, for each of the plurality of capacitive elements, electrostatic capacitance changes in response to approach of an object; a driver that supplies drive signals to the plurality of capacitive elements, respectively; a charge detector that detects a change in an electric charge corresponding to the drive signal in each of the plurality of capacitive elements; and an electric field generator that generates an electric field for reducing another electric field generated as an electric charge changes in at least in one capacitive element when the driver supplies the drive signal to the at least one capacitive element, wherein the control method includes identifying the capacitive element to which the object approaches based on a detection result by the charge detector; and adjusting the electric field generated by the electric field generator depending on whether the at least one capacitive element to which the driver supplies the drive signal includes the identified capacitive element.

According to the present disclosure, even if an object approaches, balance of radiation noise in the vicinity of an input device can be maintained.

Figure 1:
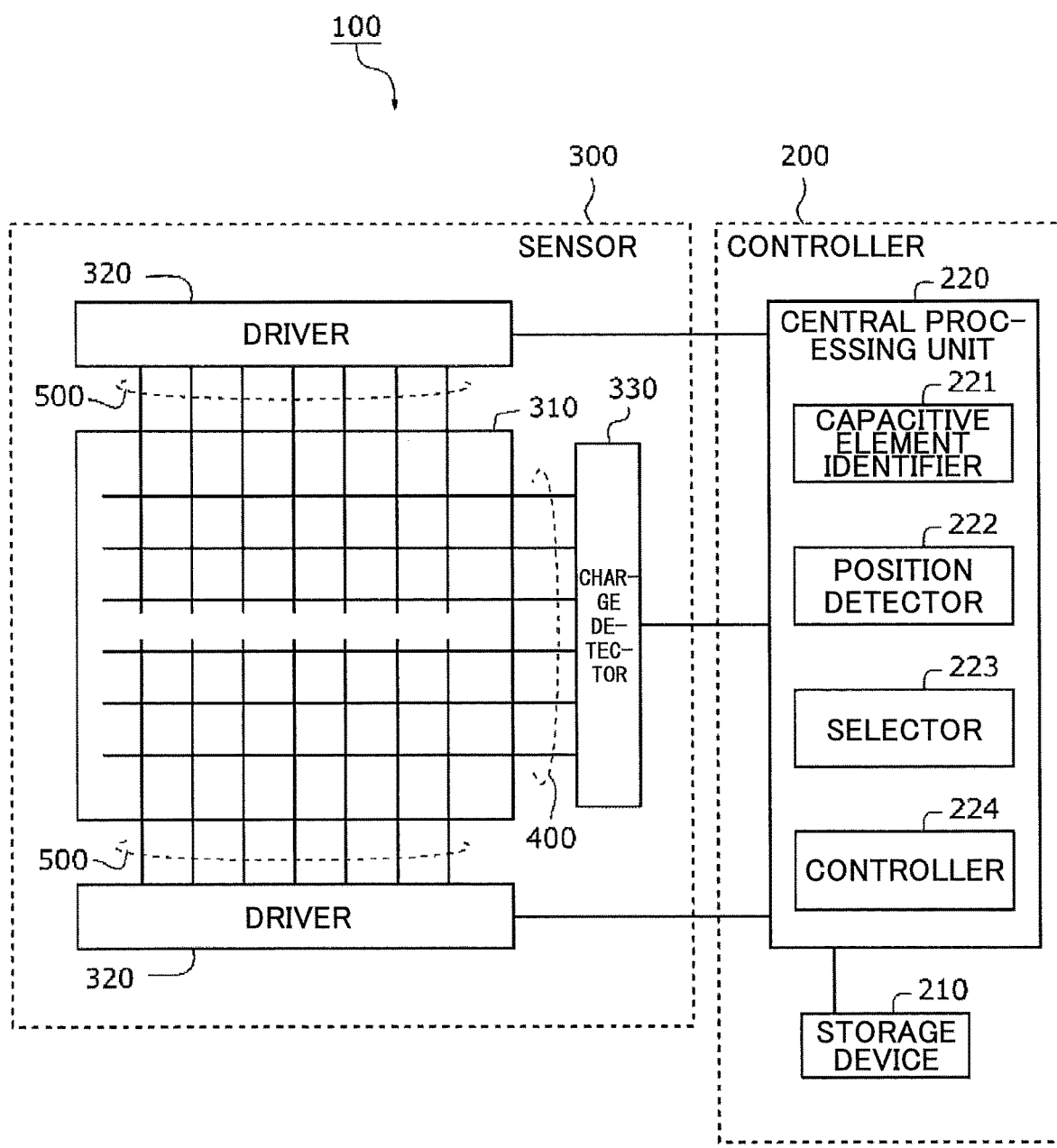
FIG. 1 is a configuration diagram of an input device according to a first embodiment of the present disclosure.

DETAILED DESCRIPTION (Overall Configuration of the First Embodiment)

In the following, an input device according to an embodiment of the present disclosure is described. As illustrated in the configuration diagram of FIG. 1, the input device 100 is provided with a control unit 200; and a sensor 300. The input device 100 inputs information corresponding to an approach of an object, such as a motion and a position of a finger with respect to an operation surface, based on a change in electrostatic capacitance.

The control unit 200 includes a storage device 210; and a central processing unit 220. The storage device 210 stores information required for the control program and the control method, which are described below. The storage device 210 is a non-volatile memory, such as a ROM (read only memory). The central processing unit 200 reads out and executes the control program stored in the storage device 210 so as to execute the control method of the input device 100.

(Sensor)

The sensor 300 is provided with a sensor main part 310; a driver 320; and a charge detector 330. The sensor 300 is controlled by a command from the central processing unit 220 and returns a detection result to the central processing unit 220.

(The Sensor Main Part of the Sensor According to a First Example)

Figure 2:
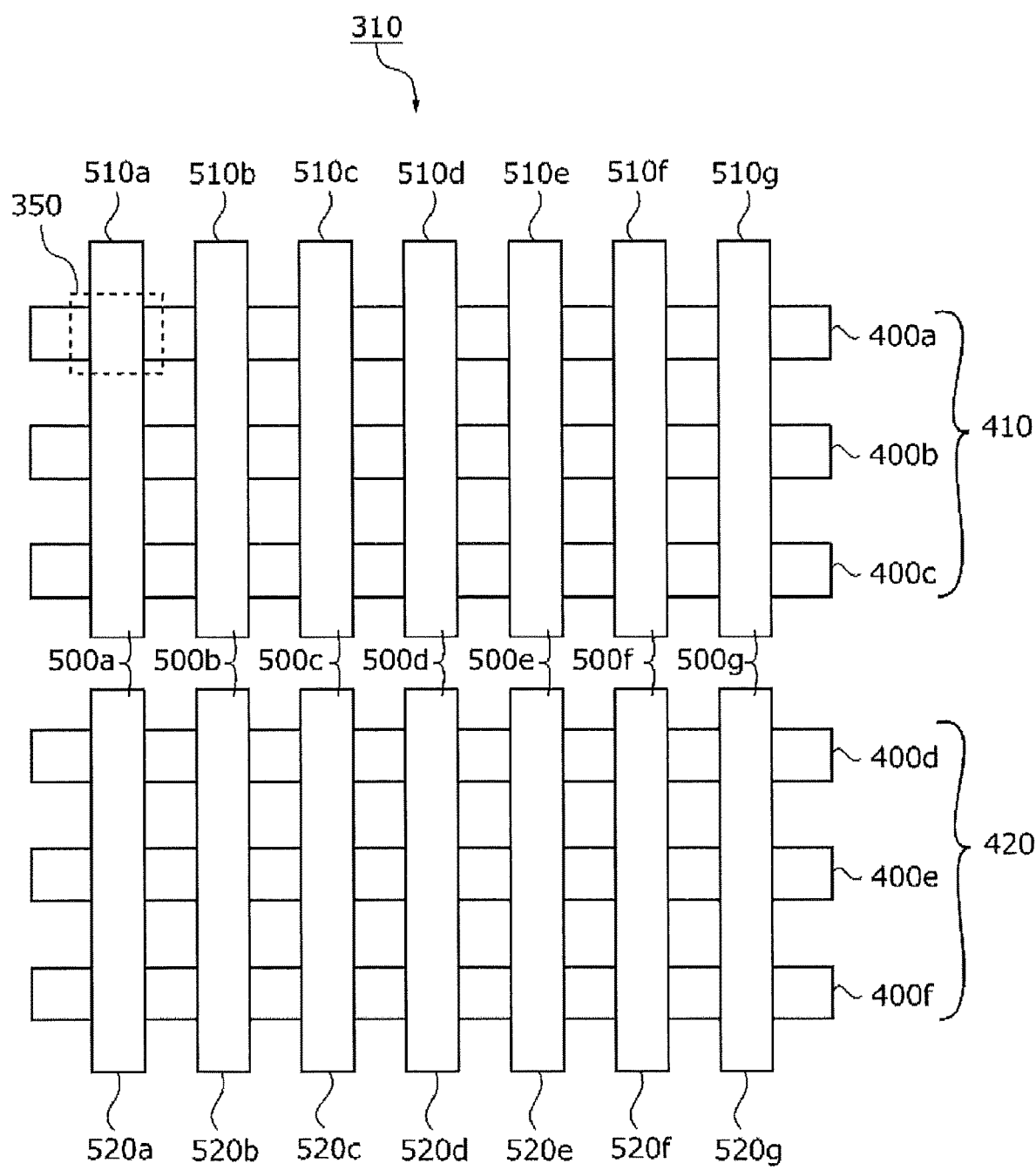
FIG. 2 is a schematic diagram of a sensor main part according to a first example of the input device illustrated in FIG. 1.

FIG. 2 is a schematic diagram of the sensor main part 310 according to the first example. The sensor main part 310 according to the first example is provided with six detection electrodes 400a through 400f (which may be referred to as the detection electrodes 400 without distinguishing them, hereinafter); and seven drive electrodes 500a through 500g (which may be referred to as the drive electrodes 500 without distinguishing them, hereinafter). The number of the detection electrodes 400 may be greater than six or less than six; and the number of the drive electrodes 500 may be greater than seven or less than seven. To simplify the description, in FIG. 2, the detection electrodes 400 and the drive electrodes 500 are depicted as linear strips with constant width; however, the detection electrodes 400 and the drive electrodes 500 having different shapes may be used. The detection electrodes 400 and the drive electrodes 500 may not orthogonally intersect.

The plurality of detection electrodes 400 is arranged approximately in parallel while evenly spaced apart. The detection electrodes 400a through 400f are arranged in alphabetical order. The plurality of detection electrodes 400 is divided into either a first detection electrode group 410 or a second detection electrode group 420. The first detection electrode group 410 is formed of three adjacent detection electrodes 400a through 400c. The second detection electrode group 420 is formed of the other three adjacent detection electrodes 400d through 400f.

The drive electrodes 500 are divided into first partial drive electrodes 510 and second partial drive electrodes 520. The first partial drive electrodes 510 and the second partial drive electrodes 520 are electrically isolated. The first partial electrodes 510a through 510g and the second partial electrodes 520a through 520g respectively form the drive electrodes 500a through 500g, which have the same a to g in the end. The first partial drive electrodes 510 extend to intersect the first detection electrode group 410. The second partial drive electrodes 520 extend to intersect the second detection electrode group 420. The first partial drive electrode 510 and the second partial drive electrode 520 that form one drive electrode 500 are linearly arranged while being separated by a gap.

Note that the plurality of detection electrodes 400 may be divided into three or more detection electrode groups. One drive electrode 500 may be divided into three or more partial drive electrodes. The number of the drive electrodes 500 that intersect a detection electrode 400 may be different from the number of the drive electrodes 500 that intersect another detection electrode 400.

A capacitive element 350 is formed at an intersection between one drive electrode 500 and one detection electrode 400. As an object, such as a finger, approaches the capacitive element 350, the electrostatic capacitance of the capacitive element 350 varies depending on a degree of proximity. An electric charge in proportion to a voltage applied between the drive electrode 500 and the detection electrode 400 is accumulated in the capacitive element 350. As the voltage between the drive electrode 500 and the detection electrode 400 varies in accordance with the drive signal of the driver 320, a charge amount is accumulated in the capacitive element 350 in response to the change in the voltage. The charge amount accumulated in the capacitive element 350 in accordance with the drive signal may be referred to as a charge signal in the following description.

A polarity of the charge signal is defined in terms of whether the drive signal of the driver 320 causes the voltage of which one of the drive electrode 500 and the detection electrode 400 to increase. As an example, in the embodiment, when a change in voltage occurs which causes the voltage of the drive electrode 500 to increase with respect to that of the detection electrode 400, a positive polarity charge signal is generated; and when a change in voltage occurs which causes the drive electrode 500 to be a low potential with respect to the detection electrode 400, a negative polarity charge signal is generated. When the voltage between the drive electrode 500 and the detection electrode 400 does not change, a signal level of the charge signal becomes zero because the electric charge of the capacitive element 350 does not change.

(Other Configurations of the Sensor)

The driver 320 controls the drive signal to be transmitted to the drive electrodes 500 based on a command from the central processing unit 220. The driver 320 supplies the drive signals to the drive electrodes 500, individually; and, as a result, the drive signals are supplied to the plurality of capacitive elements 350, respectively. The driver 320 is capable of supplying a drive signal to the first partial drive electrode 510 and the second partial drive electrode 520, individually, which form one drive electrode 500.

The drive signal is a signal that causes a voltage between the drive electrode 500 and the detection electrode 400 to be changed. The signal level of the drive signal represents a variation width of the voltage between the drive electrode 500 and the detection electrode 400. The polarity of the drive signal represents a direction of the change in the voltage, i.e., which one of the electric potential of the drive electrode 500 and the electric potential of the detection electrode 400 increases. As an example, in the embodiment, when a change in the voltage occurs such that the voltage of the drive electrode 500 increases with respect to the voltage of the detection electrode 400, the polarity of the drive signal is positive; and when a change in the voltage occurs such that the voltage of the drive electrode decreases with respect to the voltage of the detection electrode 400, the polarity of the drive signal is negative. Accordingly, when the polarity of the drive signal supplied to the capacitive element 350 is positive, the polarity of the charge signal generated in the capacitive element 350 is also positive; and when the polarity of the drive signal supplied to the capacitive element 350 is negative, the polarity of the charge signal generated in the capacitive element 350 is also negative. As described above, the driver 320 is capable of changing the polarity of the change in the electric charge in the capacitive element 350 (the polarity of the charge signal) depending on the drive signal.

For example, the drive signal may cause the voltage of the drive electrode 500 to be changed in a state in which the electric potential of the detection electrode 400 is maintained to be constant; or the drive signal may cause both the electric potential of the drive electrode 500 and the electric potential of the detection electrode 400 to be changed.

When a charge signal is to be generated in the capacitive element 350 to be detected, the driver 320 generates a positive polarity drive signal or a negative polarity drive signal that causes the voltage between the drive electrode 500 and the detection electrode 400, to which the capacitive element 350 to be detected belongs, to be varied by a predetermined variation width. When the charge signal is not to be generated in the capacitive element 350 to be detected (when the signal level of the charge signal is caused to be zero), the voltage variation between the drive electrode 500 and the detection electrode 400, to which the capacitive element 350 to be detected belongs, is caused to be zero (the level of the drive signal is caused to be zero).

The driver 320 generates the drive signals to be provided to the respective drive electrodes 500 in accordance with the control by the central processing unit 220. Namely, the driver 320 supplies the positive polarity drive signals with the predetermined signal level, the negative polarity drive signals with the predetermined signal level, or the drive signals with the signal level that is equal to zero to the respective drive electrodes 500 in accordance with the control by the central processing unit 220. In the drive electrode 500 to which the positive polarity drive signal with the predetermined signal level is supplied, the positive charge signal is generated in the capacitive element 350 belonging to the drive electrode 500. In the drive electrode 500 to which the negative polarity drive signal with the predetermined signal level is supplied, the negative charge signal is generated in the capacitive element 350 belonging to the drive electrode 500. In the drive electrode 500 to which the drive signal with the signal level that is equal to zero is supplied, no charge signal is generated in the capacitive element 350 belonging to the drive electrode 500 (the signal level of the charge signal becomes zero).

The charge detector 330 detects a change in the electric charge corresponding to the drive signal in each of the plurality of the capacitive elements 350. The charge detector 330 generates a detection signal corresponding to a sum of changes in the electric charges in the plurality of capacitive elements 350 (the seven capacitive elements 350 in the example of FIG. 2) formed in the same detection electrode 400, for each of the plurality of detection electrodes 400 (the six detection electrodes 400 in the example of FIG. 2). The detection signal generated by the charge detector 330 for each detection electrode 400 is a signal corresponding to a sum of the charge signals generated in response to the drive signal in the plurality of capacitive elements 350 belonging to the one detection electrode 400. The charge detector 330 convers the detection signal generated for each detection electrode 400 into a digital signal, for example, by a AD converter to be output to the central processing unit 220. The charge detector 330 may sequentially generate the detection signal for each detection electrode 400 one by one, or the charge detector 330 may generate the detection signals of the plurality of detection electrodes 400 at once.

In the input device 100 according to the embodiment, the at least one capacitive element 350 functions as an electric field generator for generating an electric field in the vicinity of the sensor 300. The electric field generator is provided with a function for generating an electric field for reducing another electric field that occurs with the change in the electric charge in at least one capacitive element 350 when the driver 320 supplies the drive signal to the at least one capacitive element 350. Namely, the electric field generator generates an electric field for reducing another electric field that occurs with the changes in the electric charges in the plurality of capacitive elements 350 formed in at least one drive electrode 500 when the driver 320 supplies the drive signal to the at least one drive electrode 500. Note that, when the plurality of drive electrodes 500 is simultaneously driven by an encoding drive method, which is described below, the electric fields generated in the plurality of capacitive elements 350 formed by the plurality of drive electrodes 500 cancel each other, so that the electric field in the vicinity of the sensor 300 is reduced. Accordingly, in the encoding drive method, each of the simultaneously driven plurality of capacitive elements 350 functions as the electric field generator.

(The Central Processing Unit)

The central processing unit 220 operates as a capacitive element identifier 221; a position detector 222; a selector 223; and a controller 224, based on a control program.

The capacitive element identifier 221 identifies the capacitive element 350 to which an object approaches based on the detection result by the charge detector 330. The detection result by the charge detector 330 is, specifically, a plurality of detection signals generated by the charge detector 330 for the plurality of detection electrodes 400.

The capacitive element identifier 221 calculates the detection value of the electrostatic capacitance in each capacitive element 350 based on the detection result by the charge detector 330. The detection value of the electrostatic capacitance is a value corresponding to the charge signal generated by the capacitive element 350 in response to the drive signal. In the embodiment, the capacitive element identifier 221 calculates the detection value of the electrostatic capacitance of each capacitive element 350 by the encoding drive method for simultaneously supplying the drive signals to the plurality of drive electrodes 500. The encoding drive method is described below in details.

After calculating the electrostatic capacitance detection value of each capacitive element 350, the capacitive element identifier 221 calculates a difference between the electrostatic capacitance detection value and a base value (the electrostatic capacitance detection value in the state in which the object is not in proximity) for each capacitive element 350. For the capacitive element 350 for which the calculated difference exceeds a predetermined threshold value, the capacitive element identifier 221 determines that the object approaches; and for the capacitive element 350 for which the difference is less than or equal to the predetermined threshold value, the capacitive element identifier 221 determines that the object does not approach. Note that the capacitive element identifier 221 may further apply a filtering process to the capacitive element 350 for which the determination by the threshold value is made that the object approaches. For example, if the detection value of the electrostatic capacitance of the capacitive element 350 for which the determination is made that the object approaches by the comparison with the threshold value is significantly greater than those of the capacitive elements 350 in the vicinity, the capacitive element identifier 221 may regard the determination as an erroneous determination caused by the noise and cancels the determination that the object approaches. As described above, the capacitive element identifier 221 determines, for each capacitive element 350, whether an object approaches so as to identify a group of the capacitive elements 350 representing a region to which the object approaches.

The position detector 222 calculates the coordinates of the position at which the object approaches based on the group of the capacitive elements 350 for which the determination is made by the capacitive element identifier 221 that the object approaches. For example, the position detector 222 calculates the coordinate in the direction in which the drive electrodes 500 are arranged (the X-coordinate) and the coordinate in the direction in which the detection electrodes 400 are arranged (the Y-coordinate) based on the peaks in each direction at which the electrostatic capacitance detection values of the group of the capacitive elements 350 occur. Specifically, for example, the position detector 222 applies an appropriate interpolation function to the relation between the electrostatic capacitance detection values and the coordinates in each direction, so as to calculate the coordinates of the peak values of the interpolation functions. Alternatively, based on a shape of a figure representing the group of the capacitive elements 350 identified by the capacitive element identifier 221, the position detector 222 may calculate the coordinates, for example, from the centroid.

The selector 223 selects at least one capacitive element 350 from the plurality of the capacitive elements 350 of the sensor main part 310 as the electric field generator for which the electric field is adjusted by the controller 224, which is described below. Namely, when the driver 320 supplies the drive signals to a plurality of capacitive elements 350 and the plurality of capacitive elements 350 includes the capacitive element 350 identified by the capacitive element identifier 221, the selector 223 selects, among the plurality of capacitive elements 350, at least one capacitive element 350 (which may be referred to as the capacitive element 350 in the state in which the object is not in proximity, hereinafter) that is different from the capacitive element 350 identified by the capacitive element identifier 221 as the electric field generator for which the electric field is to be adjusted by the controller 224.

Additionally, if the capacitive element 350 is selected as the electric field generator for which the electric field is to be adjusted by the controller 224, the selector 223 additionally determines the polarity of the change in the electric charge in the capacitive element 350. Namely, the selector 223 selects the at least one capacitive element 350 in the state in which the object does not approach and the charge varies in a polarity that is opposite to that of the capacitive element 350 identified by the capacitive element identifier 221 as the electric field generator for which the electric field is to be adjusted by the controller 224.

For example, when the driver 320 supplies the drive signals to the plurality of drive electrodes 500 and the plurality of capacitive elements 350 formed in the plurality of drive electrodes 500 includes the capacitive element 350 identified by the capacitive element identifier 221, the selector 223 selects, from the plurality of capacitive elements 350, at least one capacitive element 350 that is formed in the drive electrode 500 that is different from the drive electrode 500 in which the capacitive element 350 identified by the capacitive element identifier 221 is formed and that is formed in the detection electrode 400 that is different from the detection electrode 400 in which the capacitive element 350 identified by the capacitive element identifier 221 is formed, as the electric field generator for which the electric field is to be adjusted by the controller 224. In this case, the selector 223 selects at least one capacitive element 350 in the state in which the object is not in proximity that satisfies, in addition to the above-described condition, the condition that the charge varies in a polarity that is opposite to that of the capacitive element 350 identified by the capacitive element identifier 221.

The controller 224 adjusts the electric field generated in the capacitive element 350 as the electric field generator, depending on a proximity state of the object to the sensor main part 310. Namely, the controller 224 adjusts the electric field generated by the electric field generator, depending on whether the at least one capacitive element 350 to which the driver 320 supplies the drive signal includes the capacitive element 350 identified by the capacitive element identifier 221 (the capacitive element 350 to which the object approaches). For example, the controller 224 adjusts the electric field generated by the electric field generator, depending on whether the plurality of capacitive elements 350 formed in at least one drive electrode 350 to which the driver 320 supplies the drive signal includes the capacitive element 350 identified by the capacitive element identifier 221.

The controller 224 adjusts the charge amount, which varies as the drive signal is supplied, in the capacitive element 350 in the state in which the object is not in proximity that is different from the capacitive element 350 identified by the capacitive element identifier 221, depending on whether the capacitive element 350 in the state in which the object is not in proximity is selected by the selector 223. Specifically, for example, the controller 224 adjusts the charge amount, which varies as the drive signal is supplied, in the capacitive element 350 in the state in which the object is not in proximity to be smaller if the capacitive element 350 is selected by the selector 223, compared to a case in which the capacitive element 350 is not selected by the selector 223.

For the drive electrodes 500 in which the capacitive element 350 selected by the selector 223 is not formed, the controller 224 supplies a common drive signal to the plurality of partial drive electrodes (the first partial drive electrodes 510 and the second partial drive electrodes 520). For the drive electrode 500 in which the capacitive element 350 selected by the selector 223 is formed, the controller 224 supplies, between the plurality of partial drive electrodes (the first partial electrode 510 and the second partial electrode 520), different drive signals to the part of the partial drive electrodes that forms the capacitive element 350 selected by the selector and to the other part of the partial drive electrodes, respectively. Specifically, for example, for the drive electrode 500 in which the capacitive element 350 selected by the selector 223 is formed, the controller 224 adjusts the level of the drive signal supplied to, among the plurality of partial drive electrodes (the first partial drive electrode 510 and the second partial drive electrode 520), the part of the partial drive electrodes that forms the capacitive element 350 selected by the selector 223 to be small, compared to the drive signal supplied to the other part of the partial drive electrodes.

The controller 224 adjusts the electric field generated by the capacitive element 350 by adjusting the charge amount accumulated in the capacitive element 350 in response to the drive signal. The controller 224 adjusts the electric field generated by the capacitive element 350 by changing the electrostatic capacitance of the capacitive element 350 and the level of the drive signal supplied to the capacitive element 350. Namely, the controller 224 adjusts at least one of the electrostatic capacitance of the capacitive element 350 in the state in which the object is not in proximity and the level of the drive signal supplied to the capacitive element 350 in the state in which the object is not in proximity, depending on whether the capacitive element 350 in the state in which the object is not in proximity is selected as the electric field generator.

(The Encoding Drive Method)

In the input device 100 according to the embodiment, the capacitive element identifier 221 calculates a detection value of the electrostatic capacitance of each capacitive element 350 by the encoding drive method such that the drive signals are simultaneously supplied to the plurality of drive electrodes 500. In the following, the method of calculating the electrostatic capacitance detection values by the encoding drive method is described.

In the encoding drive method, while changing the combination of polarities of the plurality of drive signals (polarity pattern) simultaneously supplied to the plurality of drive electrodes 500, respectively, into a plurality of combinations, the capacitive element identifier 221 obtains, for each polarity pattern, detection signals from the same detection electrode 400 generated by the charge detector 330. The capacitive element identifier 221 calculates the electrostatic capacitance detection values of the respective plurality of capacitive elements 350 which is formed in one detection electrode 400, based on the predetermined plurality of polarity patterns and the detection signals that are obtained, for the one detection electrode 400, a number of times that is the same as the number of the polarity patterns.

In the encoding drive method, the absolute values of the signal levels (the variation width of the voltage between the drive electrode 500 and the detection electrode 400) are approximately equal between the positive polarity drive signal and the negative polarity drive signal generated by the driver 320. Accordingly, the absolute values of the signal levels of the charge signals generated in the respective capacitive elements 350 are the same between cases in which the positive polarity drive signal and the negative polarity drive signal are respectively supplied to the capacitive elements 350 having the same electrostatic capacitance. The absolute value of the signal level of the charge signal is proportional to the electrostatic capacitance of the capacitive element 350. The capacitive element identifier 221 calculates the value corresponding to the absolute value of the signal level of the charge signal as the detection value of the electrostatic capacitance of the capacitive element 350.

In the encoding drive method, setting the signal level of the drive signal to zero may be included as a polarity of the drive signal, in addition to the positive and negative polarities of the drive signal. In this case, the capacitive element identifier 221 controls the driver 320 so that the drive signal supplied to each drive electrode 500 is provided with a signal level with a predetermined absolute value and the positive polarity; provided with a signal level with a predetermined absolute value and the negative polarity; or provided with an approximately zero signal level.

When drive signals are simultaneously supplied to the plurality of drive electrodes 500, charge signals are simultaneously generated in the plurality of capacitive elements 350 formed in one detection electrode 400. Through one detection electrode 400, a sum of the charge signals of the plurality of capacitive elements 350 formed in the one detection electrode 400 is input to the charge detector 330, and the charge detector 330 generates a detection signal corresponding to the input sum of the charge signals. In the encoding drive method, a detection signal corresponding to a sum of charge signals input through one detection electrode 400 may be referred to as a combined signal in the following description.

Upon obtaining a plurality of combined signals corresponding to a plurality of polarity patterns from the charge detector 330, the capacitive element identifier 221 obtains the electrostatic capacitance detection values of the plurality of capacitive elements 350 formed in the one detection electrode 400 by the following calculation.

Suppose that the number of the capacitive elements 350 belonging to the one detection electrode 400 is N. Namely, suppose that N lines of drive electrodes 500 intersect the one detection electrodes 400. The electrostatic capacitance detection values of the N capacitive elements 350 can be represented by the N-by-one matrix C, as shown in the formula 1. A suffix of an element of the matrix C is a number for identifying each of the N capacitive elements 350, and each number from 1 to N corresponds to one capacitive element 350.

[Expression 1]

$$c = \begin{pmatrix} c_1 \\ \vdots \\ c_N \end{pmatrix} \quad \text{(formula 1)}$$

N combined signals obtained by driving N times with N polarity patterns can be represented by the N-by-1 matrix A, as shown in the formula 2. A suffix of an element of the matrix A represents that the corresponding element is a combined signal obtained by what number of times of driving. The number of the elements of the matrix A is equal to the number of the elements of the matrix C. Namely, driving is executed the number of times that is equal to the number of the capacitive elements 350.

[Expression 2]

$$A = \begin{pmatrix} a_1 \\ \vdots \\ a_N \end{pmatrix} \quad \text{(formula 2)}$$

The N-by-N matrix D shown in the formula 3 represents the N polarity patterns. Each element of the matrix D is a numerical value representing the polarity of one drive signal. If the drive signal has a signal level with the positive polarity and the predetermined absolute value, the value of the element is "1." If the drive signal has a signal level with the negative polarity and the predetermined absolute value, the value of the element is "−1." If the signal level is zero, the value of the element is "0."

[Expression 3]

$$D = \begin{pmatrix} d_{11} & \cdots & d_{1N} \\ \vdots & \ddots & \vdots \\ d_{N1} & \cdots & d_{NN} \end{pmatrix} \quad \text{(formula 3)}$$

The j-th row of the matrix D ($1 \leq j \leq N$) represents the polarity pattern in the j-th driving. Each row of the matrix D represents one polarity pattern used for generating one combine signal. The columns of the matrix D correspond to the simultaneously driven plurality of drive electrodes 500, respectively.

[Expression 4]

$$D \cdot C = A \quad \text{(formula 4)}$$

After obtaining N combined signals by driving N times, the capacitive element identifier 221 calculates the electrostatic capacitance detection values of the respective capacitive elements 350 by the product of the inverse matrix D−1 of the matrix D and the matrix A, as shown in the formula 5. Note that the present disclosure is not limited to the method of directly calculating the matrix C from the inverse matrix D−1. If a value can be obtained that varies in accordance with the variation in the electrostatic capacitance of each capacitive element 350, a calculation method other than the method of the formula 5 using the inverse matrix D−1 may be used.

[Expression 5]

$$C = D^{-1} \cdot A \quad \text{(formula 5)}$$

As the 7-by-7 matrix D that can be used for the sensor 310 of FIG. 2, for example, the matrix of the formula 6 can be used.

[Expression 6]

$$D = \begin{pmatrix} 1 & 1 & 1 & -1 & 1 & -1 & -1 \\ -1 & 1 & 1 & 1 & -1 & 1 & -1 \\ -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \end{pmatrix} \quad \text{(formula 6)}$$

The matrix D may preferably selected so that the number of the positive polarity elements and the number of the negative polarity elements in each row corresponding to one polarity pattern are close (i.e., the sum of the elements in each row becomes close to zero). In the example of the formula 6, the sums of the elements of respective polarity patterns are all one. As the number of the positive polarity elements and the number of the negative polarity elements included in one polarity pattern becomes closer, the deviation of the polarity of the drive signals supplied to the plurality of drive electrodes 500 per single driving becomes small. As a result, the variations in the electric fields caused by charging and discharging of the electric charges in the capacitive elements tend to be easily canceled, and the noise radiated from the sensor main part 310 is reduced as a whole.

Here, the radiation noise reduction effect caused by selecting the matrix D (the polarity pattern groups), as described above, can be obtained in a state in which the object is not approaching the sensor main part 310. When a conductive object with a potential that is close to the ground potential (human body, etc.) approaches the sensor main part 310, the electric field that occurs in the capacitive element 350 (which includes the drive electrode 500 and the detection electrode 400 that form the capacitive element 350) is locally shielded by the object. This case is equivalent to a state in which the balance between the number of the positive polarity elements and the number of the negative polarity elements included in the polarity pattern is lost, and the noise radiated from the sensor main body 310 increases. Thus, in the input device 100 according to the embodiment, the electric field that is generated in the capacitive element 350 in a state in which the object does not approaches (the state in which the object is not in proximity) is adjusted by the above-described controller 224, so that the balance of the electric fields that is lost due to the approaching object can be corrected.

(Control Method)

Figure 3:
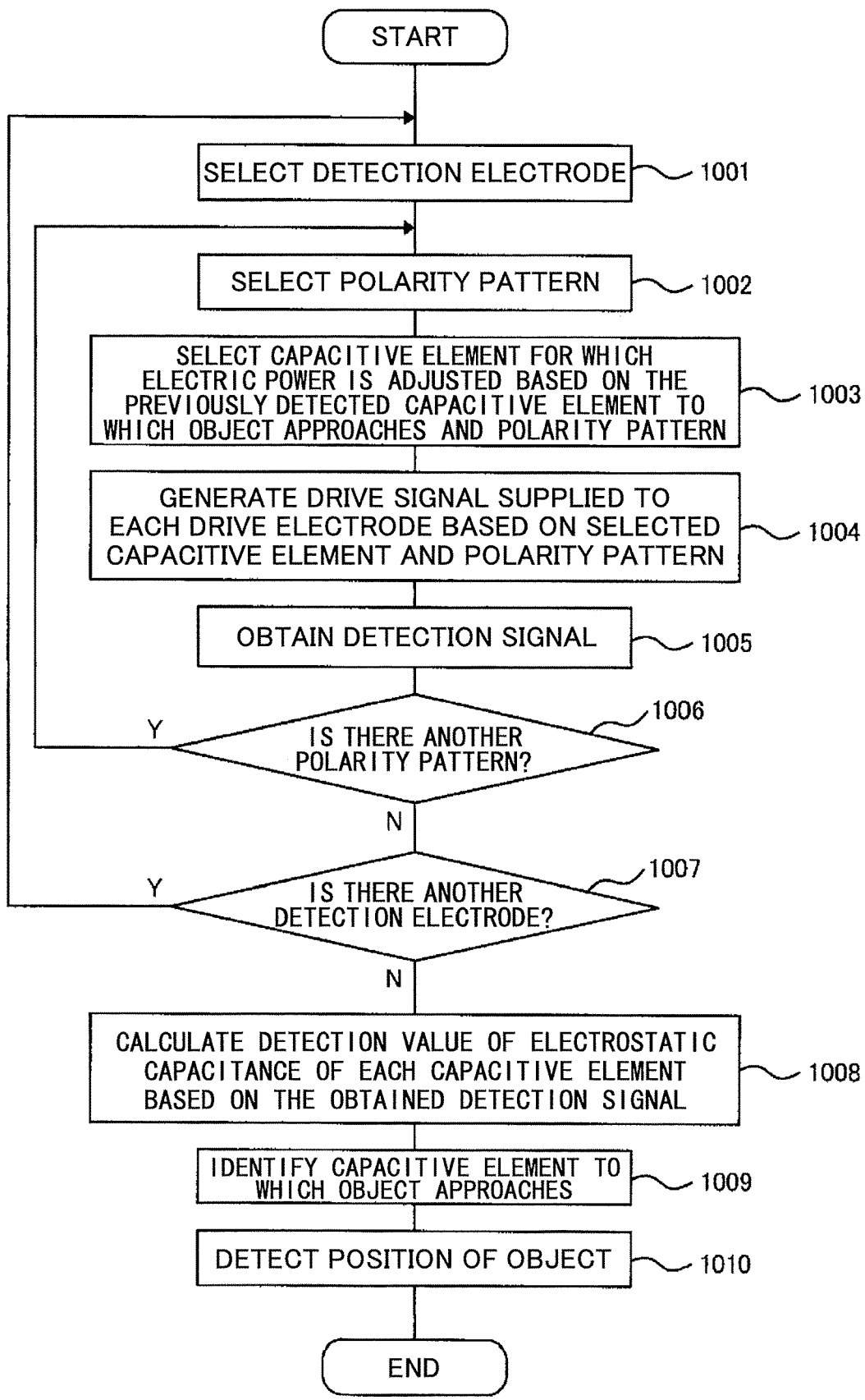
FIG. 3 is a flow chart illustrating an operation of the input device shown in FIG. 1.

Next, by referring to the flow chart of FIG. 3, the control method of the input device 100 of FIG. 1 is described. The flow chart of FIG. 3 represents a single process of detecting the electrostatic capacitance of each of all the capacitive elements 350 in the sensor main part 310 and detecting the position of the object based on the detection result (which may be referred to as the detection process, hereinafter). The control unit 200 repeatedly executes the process shown in the flow chart of FIG. 3 at predetermined time intervals.

Step 1001:

First, the capacitive element identifier 221 selects, from the plurality of detection electrodes 400, a detection electrode 400 for which a detection signal is to be generated by the charge detector 330. At this time, one or more detection electrodes 400 may be selected. If more than one electrodes 400 are to be selected, for example, the capacitive element identifier 221 selects the more than one detection electrodes 400 from the same detection electrode group (in the example of FIG. 2, the first detection electrode group 410 or the second detection electrode group 420).

Step 1002:

Next, the capacitive element identifier 221 selects one polarity pattern of the drive signals to be supplied to the plurality of drive electrodes 500.

Step 1003:

After the capacitive element identifier 221 selects the polarity pattern of the drive signal, the selector 223 selects the capacitive element 350 as the electric field generator for which the electric field is to be adjusted by the controller 224. The controller 224 selects the capacitive element 350 to be adjusted by the controller 224, based on the capacitive element 350 in proximity to the object identified by the previous detection process and the polarity pattern selected by step 102.

When the capacitive element 350 in proximity to the object is identified by the previous detection process, the selector 223 selects a capacitive element 350 to be adjusted by the controller 224 from the capacitive elements 350 in proximity to the object other than the identified capacitive element 350. When the capacitive element 350 in proximity to the object is not identified by the previous detection process, the selector 223 does not select a capacitive element 350 to be adjusted by the controller 224.

Specifically, the selector 223 defines, as a first condition of the capacitive element 350 to be selected, the condition that the capacitive element 350 is formed in the drive electrode 500 that is different from the drive electrode 500 in which the capacitive element 350 in proximity to the object identified by the previous detection process is formed.

Additionally, the selector 223 defines, as a second condition of the capacitive element 350 to be selected, the condition that the capacitive element 350 is formed in the detection electrode 400 that is different from the detection electrode 400 in which the capacitive element 350 in proximity to the object identified by the previous detection process is formed. When the first condition and the second condition are satisfied, it can be made difficult that the calculation result of the electrostatic capacitance detection value for the capacitive element 350 in proximity to the object is affected by the adjustment of the electric field by the controller 224.

Furthermore, the selector 223 defines, as a third condition of the capacitive element 350 to be selected, the condition that the electric charge varies in a polarity opposite to the polarity of the capacitive element 350 identified by the capacitive element identifier 221. The third condition is equivalent to the condition that, to the capacitive element 350, the drive signal is supplied that is provided with the polarity opposite to the polarity of the drive signal supplied to the capacitive element 350 in proximity to the object identified by the previous detection process. As the third condition varies depending on the polarity pattern, the selector 223 selects the capacitive element 350 for each polarity pattern.

Note that, when the level of the drive signal supplied to the capacitive element 350 in proximity to the object is zero, the selector 223 does not selects the capacitive element 350 corresponding to such a capacitive element 350. The reason is that, when the level of the drive signal is zero, the electric field due to charging and discharging of the electric charge is not generated in the capacitive element 350, and the balance of the electric field is not lost irrespective of whether the object approaches the capacitive element 350.

Step 1004:

After the above-described step 1003 is executed, then, the capacitive element identifier 221 controls the driver 320 so that the drive signal with the polarity corresponding to the polarity pattern is to be supplied to each drive electrode 500. At this time, in order to adjust the electric field generated by the capacitive element 350 selected at step 1003, the controller 224 modifies the drive signal controlled by the capacitive element identifier 221.

For example, as for the drive electrode 500 in which the capacitive element 350 selected by the selector 223 is not formed, the controller 224 supplies a common drive signal defined by the polarity pattern to the plurality of partial electrodes (the first partial drive electrode 510 and the second partial drive electrode 520) forming the drive electrode 500. Namely, the controller 224 does not modify the drive electrode controlled by the capacitive element identifier 221.

However, as for the drive electrode 500 in which the capacitive element 350 selected by the selector 223 is formed, the controller 224 supplies, out of the plurality of partial drive electrodes (the first drive electrode 510 and the second drive electrode 520), different drive signals to a part of the partial drive electrodes forming the capacitive element 350 selected by the selector 223 and to the other part of the partial drive electrodes, respectively. Namely, as for the capacitive element 350 not selected at step 1003, the controller 224 supplies the drive signal defined by the polarity pattern, without modification; and, as for the capacitive element 350 selected at step 1003, the controller supplies a signal that is different from the drive signal defined by the polarity pattern.

Specifically, as for the drive electrode 500 in which the capacitive element 350 selected by the selector 223 is formed, the controller 224 adjusts, out of the plurality of partial drive electrodes (the first partial drive electrode 510 and the second partial drive electrode 520), the level of the drive signal to be supplied to the part of the partial drive electrodes forming the capacitive element 350 selected by the selector to be less than that of the drive signal to be supplied to the other part of the partial drive electrodes. By reducing the level of the drive signal, the charge amount accumulated in the capacitive element 350 in response to the drive signal is reduced, and, thus, the generated electric field is reduced. Consequently, the controller 224 reduces the electric field of the capacitive element 350 selected by the selector 223.

When the electric field in one polarity is reduced as it is shielded by an object, such as a finger, the electric field in the other polarity becomes relatively large, and the balance between the positive electric field and the negative electric field is lost. Thus, the noise radiated from the sensor main part 310 becomes large. According to the embodiment, the electric field from the capacitive element 350 selected by the selector 223 is reduced by the adjustment of the controller 224. Accordingly, when the electric field in one polarity is reduced as it is shielded by an object, the electric field in the other polarity is also reduced. As a result, the balance between the positive electric field and the negative electric field generated by the sensor main part 310 is returned to the balance in the state where the object is not in proximity to the sensor main part 310, so that an increase of the noise radiated from the sensor main part 310 can be suppressed.

Note that reducing the level of the drive signal so as to adjust the electric field by the controller 224 includes setting the level of the drive signal to be approximately zero. If the level of the drive signal is set to zero, a part of the plurality of partial drive electrodes forming the drive electrode 500 does not contribute to accumulation of the electric charge, and the electrostatic capacitance of the capacitive element 350 becomes substantially small. As described above, the controller 224 may adjust the electrostatic capacitance of the capacitive element 350 by not supplying the drive signal to a part of the plurality of partial drive electrodes.

Step 1005:

When the drive signal is supplied to each drive electrode 500 at step 1004, the charge detector 330 generates a detection signal (combined signal) corresponding to the sum of the electric signals generated at the respective capacitive elements 350 of the detection electrode 400 selected at step 1001. The capacitive element identifier 221 obtains the detection signal generated by the charge detector 330 and stores the detection signal in the storage device 210.

Step 1006:

After obtaining the detection signal at step 1004, if there exists another polarity pattern for which the detection signal is not obtained, the capacitive element identifier 221 returns to step 1002 and repeats the process on and after step 1002.

Step 1007:

After completing execution of the process from step 1002 to 1005 for all the polarity patterns, if there exists a detection electrode 400 from which the detection signal is not obtained yet, the capacitive element identifier 221 returns to step 1001 and repeats the process on and after step 1001.

Step 1008:

After completing execution of the process from step 1001 to 1006 for all the detection electrodes 400, the capacitive element identifier 221 calculates the electrostatic capacitance detection values of the respective capacitive elements 350 formed in each detection electrode 400 based on the detection signal obtained from the detection electrode 400 and the formula 5, etc.

Step 1009:

After calculating the electrostatic capacitance detection value of each capacitive element 350, the capacitive element identifier 221 calculates, for each capacitive element 350, the difference between the electrostatic capacitance detection value and a base value; and the capacitive element identifier 221 determines, for each capacitive element 350, whether an object approaches by comparing the calculated difference with a threshold value. The capacitive element identifier 221 applies a predetermined filtering process to the determination result of the proximity state of the object based on the threshold value so as to identify a region (a group of capacitive elements 350) to which the object approaches.

Step 1010:

The position detector 222 calculates the coordinates of the position to which the object approaches, based on the group of the capacitive elements 350 for which the determination is made by the capacitive element identifier 221 that the object approaches. For example, the position detector 222 calculates the coordinate in the direction in which the drive electrodes 500 are arranged and the coordinate in the direction in which the detection electrodes 400 are arranged, based on the peaks of the electrostatic capacitance detection values of the group of the capacitive elements 350 in the respective directions.

Figure 4:
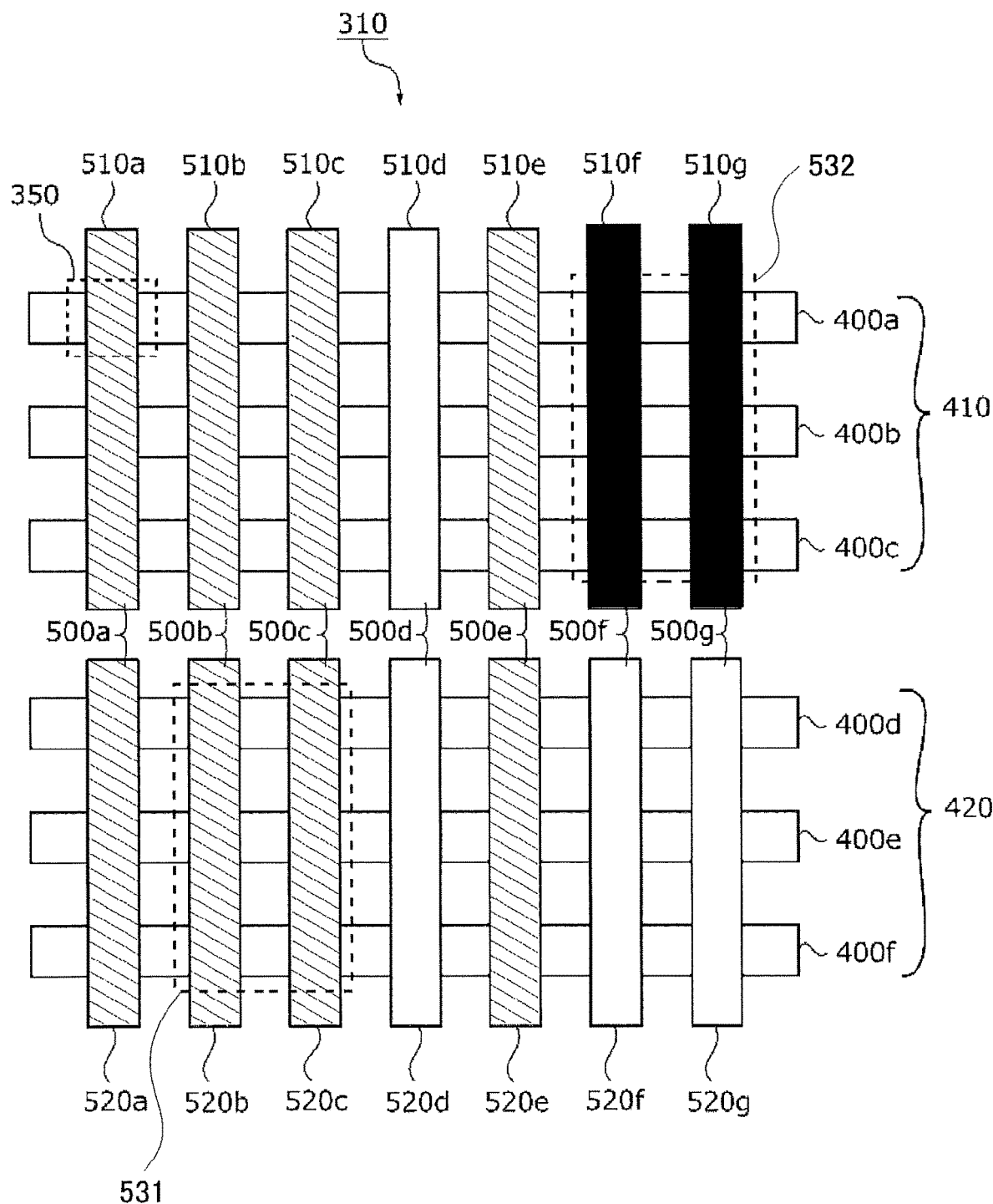
FIG. 4 is a diagram illustrating an example of selection of a capacitive element by a selector and an example of control of a drive signal by a controller when the sensor main part according to first example shown in FIG. 2 is used.

Next, an example of selection of the capacitive elements 350 by the selector 223 and an example of the control of the drive signal by the controller 224, in which the sensor main part 310 according to the first example shown in FIG. 2 is used, are described by referring to FIG. 4.

In the example of FIG. 4, the capacitive elements 350 in proximity to the object identified by the capacitive element identifier 221 are the six capacitive elements 350 in the region 531 shown in FIG. 4. All the capacitive elements 350 other than the capacitive elements 350 within this region 531 are in the state in which the object is not in proximity and can be candidates to be selected by the selector 223 as the electric field generator for which the electric field is to be adjusted by the controller 224.

Here, by the above-described first condition, the candidates of the capacitive elements 350 to be selected by the selector 223 are narrowed down to the capacitive elements 350 formed in the drive electrodes 500 (the drive electrodes 500*a*, 500*d*, 500*e*, 500*f*, and 500*g* in the example of FIG. 4) other than the drive electrodes 500 in which the capacitive elements 350 in proximity to the object are formed.

Additionally, by the above-described second condition, the candidates of the capacitive elements 350 to be selected by the selector 223 are narrowed down to the capacitive elements 350 formed in the detection electrodes 400 (the first detection electrode group in the example of FIG. 4) other than the detection electrodes 400 in which the capacitive elements 350 in proximity to the object are formed.

Furthermore, by the above-described third condition, the candidates of the capacitive elements 350 to be selected by the selector 223 are narrowed down to the capacitive elements 350 in which the electric charges vary in the polarity opposite to that of the capacitive elements 350 in proximity to the object, i.e., the capacitive elements 350 to which the drive signals with the polarity that is opposite to that of the capacitive elements 350 in proximity to the object are supplied. In the example of FIG. 4, the positive polarity drive signals are supplied to the drive electrodes indicated by the oblique lines, and the negative polarity drive signals are supplied to the drive electrodes without the oblique lines. As the positive polarity drive signals are supplied to the capacitive elements 350 within the area 531 to which the object approaches, the candidates of the capacitive elements 350 to be selected by the selector 223 are narrowed down to the capacitive elements 350 to which the negative polarity drive signals are supplied.

Accordingly, in the example of FIG. 4, the selector 223 selects the six capacitive elements 350 within the region 532 that satisfy all the above-described first condition through third condition, as the electric field generators for which the electric fields are to be adjusted by the controller 224. The controller 224 reduces the electric fields generated by the negative polarity drive signals in the capacitive elements 350 within the region 532 so that the reduced amount of the electric fields generated by the positive polarity drive signals in the capacitive elements 350 within the region 531 to which the object approaches can be balanced. For example, the controller 224 sets the levels of the drive signals supplied to the capacitive elements 350 within the region 532 through the first partial drive electrode 510f and the first partial drive electrode 510g to zero, or reduces the levels of the drive signals to be smaller than usual.

Note that, if the capacitive element 350 in proximity to the object identified by the capacitive element identifier 221 include P capacitive elements 350 to which the positive polarity drive signals are supplied and Q capacitive elements 350 to which the negative polarity drive signals are supplied, the selector 223 may select P capacitive elements 350 to which the negative polarity signals are supplied and Q capacitive elements 350 to which the positive polarity signals are supplied, as the electric field generator for which the electric fields are to be adjusted by the controller 224. Alternatively, in this case, if P>Q, the selector 223 may select (P−Q) capacitive elements 350 to which the negative polarity drive signals are supplied; if Q>P, the selector 223 may select (Q−P) capacitive elements 350 to which the positive polarity drive signals are supplied; and if Q=P, the selector 223 may set the number of the capacitive elements 350 to be selected to zero.

The controller 224 may adjust the levels of the drive signals so that the reduced amount of the electric fields of the capacitive elements 350 in proximity to the object identified by the capacitive element identifier 221 becomes close to the reduced amount of the electric fields of the capacitive elements 350 selected as the electric field generators. For example, the controller 224 may adjust the levels of the drive signals depending on the ratio between the number of the capacitive elements 350 in proximity to the object and the number of the capacitive elements 350 to be selected as the electric field generators.

Furthermore, as the generation of the radiation noise is affected by the areas of the first partial drive electrodes 510 and the second partial drive electrodes 520, it is preferable that the areas of the first partial drive electrodes 510 and the second partial drive electrodes 520 that form the capacitive elements 350 identified by the capacitive element identifier 221 be close to the areas of the first partial drive electrodes 510 and the second partial drive electrodes 520 that form the capacitive elements 350 to be selected as the electric field generators. For example, the areas of all the partial drive electrodes may be approximately equal.

In the state in which an object, such as a finger, is not in proximity to the capacitive elements 350, the number of the capacitive elements 350 to which the positive polarity drive signals are supplied and the number of the capacitive elements 350 to which the negative polarity drive signals are supplied become close because of the predetermined polarity patterns, and the radiation noise is effectively reduced. However, as the object approaches the capacitive elements 350, the radiation noise from the drive electrodes 500 and the detection electrodes 400 is absorbed by the object, and the balance of the radiation noise in the vicinity of the input device 100 is lost. According to the embodiment, by adjusting the electric fields of the capacitive elements 350 that function as the electric field generators, the balance of the radiation noise in the vicinity of the input device 100 can be maintained, even if the object approaches.

Furthermore, according to the embodiment, the configuration can be simplified compared to a case in which a dedicated configuration is provided as the electric field generator because the electric fields of the capacitive elements 350 that function as the electric field generators are adjusted.

Furthermore, according to the embodiment, the single drive electrode 500 is separated into the plurality of partial drive electrodes (the first partial drive electrode 510 and the second partial drive electrode 520), and different drive signals can be supplied to the respective partial drive electrodes. Accordingly, the plurality of capacitive elements 350 formed in the single drive electrode 500 can be divided into a plurality of groups of the capacitive elements 350, and the drive signals can be independently supplied to the respective groups. As a result, without affecting the detection of the electric charges for one group of the capacitive elements 350, the drive signals supplied to the other group of the capacitive elements 350 can be controlled, and the generated electric fields can be adjusted.

(The Sensor Main Part According to a Second Example)

Figure 5:
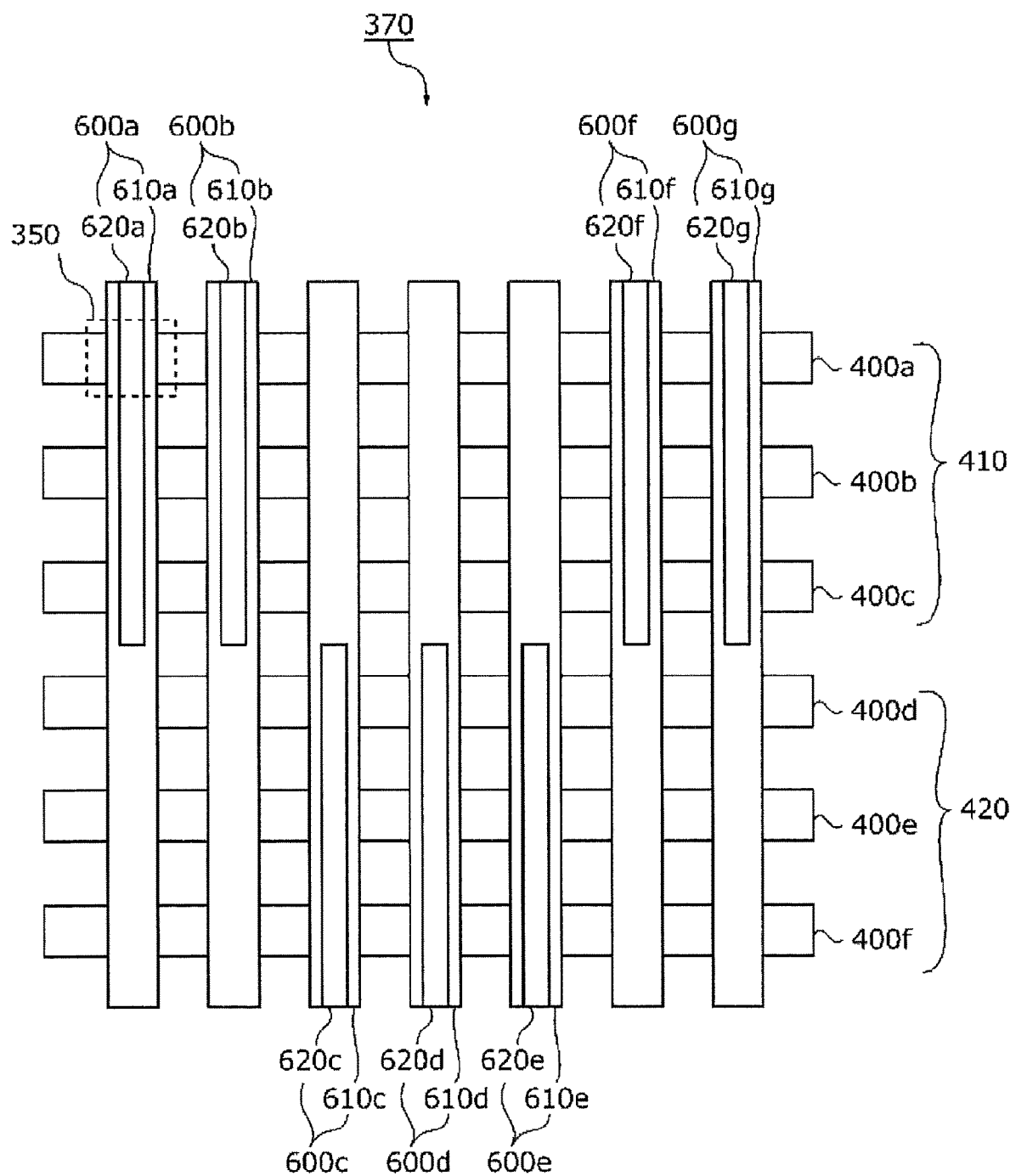
FIG. 5 is a schematic diagram of a sensor main part according to a second example.

Next, the sensor main part 370 according to the second example in the input device 100 according to the embodiment is described. FIG. 5 is a schematic diagram of the sensor main part 370 according to the second example. The sensor main part 370 according to the second example is provided with six detection electrodes 400a through 400f, which are similar to those of the first example; and seven drive electrodes 600a through 600g (which may be referred to as the driving electrodes 600 without distinction, hereinafter), which are different from those of the first example. The number of the detection electrodes 400 may be greater than or less than 6; and the number of the drive electrode 600 may be greater than or less than 7. To simplify the description, in FIG. 4, the detection electrodes 400 and the drive electrodes 600 are depicted as linear strips with constant width; however, the detection electrodes 400 and the drive electrodes 600 having different shapes may be used. The detection electrodes 400 and the drive electrodes 600 may not orthogonally intersect.

The drive electrodes 600 are divided into first partial drive electrodes 610 and second partial drive electrodes 620. The first partial drive electrodes 610 and the second partial drive electrodes 620 are electrically isolated. The first partial electrodes 610a through 610g and the second partial electrodes 620a through 620g respectively form the drive electrodes 600a through 600g, which have the same a to g in the end.

Each of the first partial drive electrodes 610a, 610b, 610f, and 610g is provided with two thin strip portions that extend to intersect the first detection electrode group 410; and a thick strip portion that extends to intersect the second detection electrode group 420. In each of the first partial drive electrodes 610a, 610b, 610f, and 610g, corresponding one of the second partial drive electrodes 620a, 620b, 620f, and 620g extends to intersect the first detection electrode group 410 between the two thin strip portions that intersect the first detection electrode group 410.

Each of the first partial drive electrodes 610c, 610d, and 610e is provided with a thick strip portion that extends to intersect the first detection electrode group 410; and two thin strip portions that extend to intersect the second detection electrode group 420. In each of the first partial drive electrodes 610c, 610d, and 610e, corresponding one of the second partial drive electrodes 620c, 620d, and 620e extends to intersect the second detection electrode group 420 between the two thin strip portions that intersect the second detection electrode group 420.

Note that the plurality of detection electrodes 400 may be divided into three or more detection electrode groups. One drive electrode 600 may be divided into three or more partial drive electrodes. The number of the drive electrodes 600 that intersect a detection electrode 400 may be different from the number of the drive electrodes 600 that intersect another detection electrode 400.

A capacitive element 350 is formed at an intersection between one drive electrode 600 and one detection electrode 400.

Figure 6:
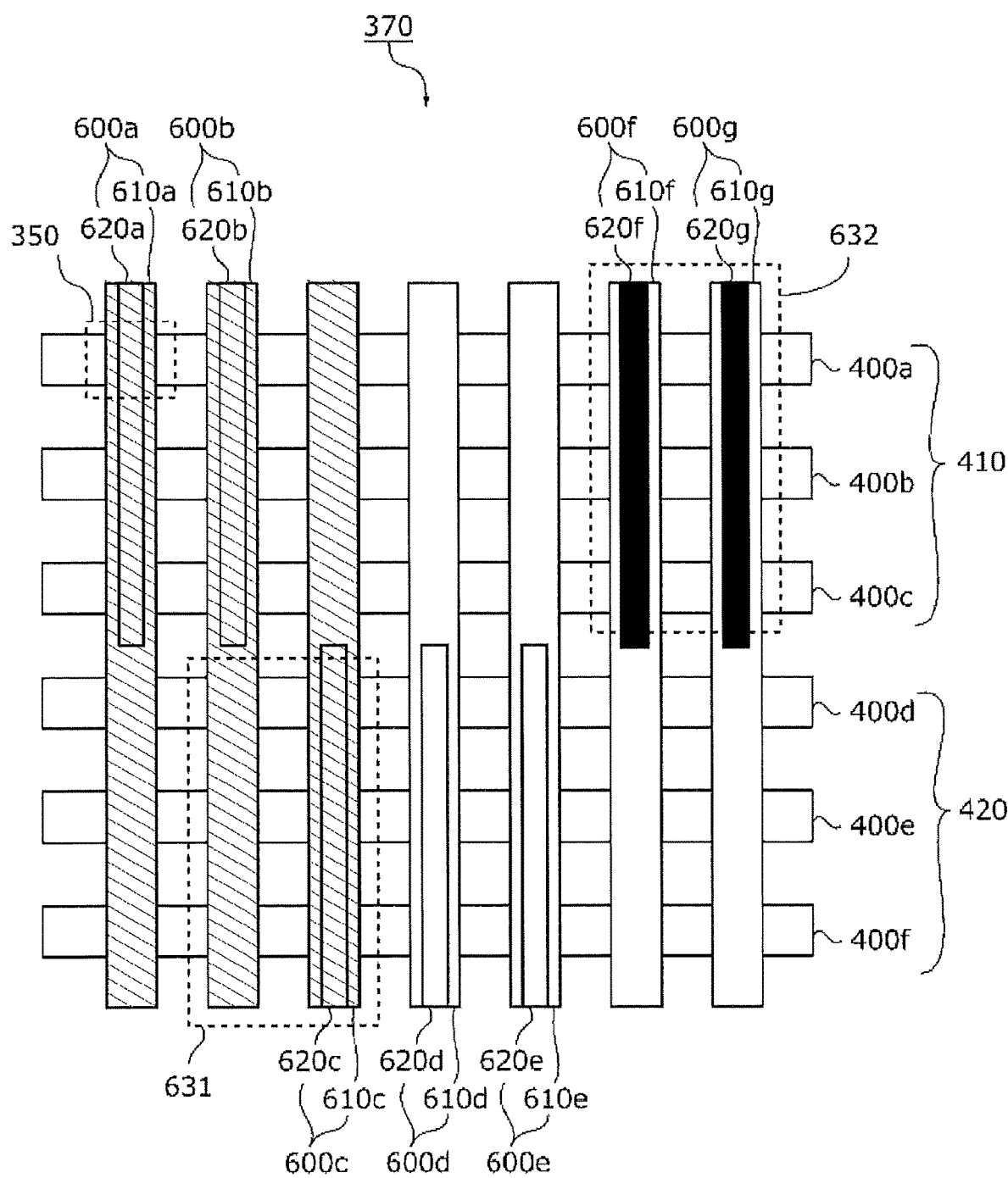
FIG. 6 is a diagram illustrating an example of selection of a capacitive element by the selector and an example of control of a drive signal by the controller when the sensor main part according to the second example shown in FIG. 5 is used.

An example of the selection of the capacitive element 350 by the selector 223 and an example of the control of the drive signals by the controller 224, in which the sensor main part 370 according to the second example illustrated in FIG. 5 is used, are described by referring to FIG. 6.

In the example of FIG. 6, the six capacitive elements 350 within the region 631 shown in FIG. 6 are the capacitive elements 350 in proximity to the object identified by the capacitive element identifier 221. All the capacitive elements 350 other than the capacitive elements 350 within the region 631 are in the state in which the object is not in proximity and can be candidates to be selected by the selector 223 as the electric field generators for which the electric fields are to be adjusted by the controller 224.

Here, by the above-described first condition, the candidates of the capacitive elements 350 to be selected by the selector 223 are narrowed down to the capacitive elements 350 formed in the drive electrodes 600 (the drive electrodes 600a, 600d, 600e, 600f, and 600g in the example of FIG. 6) other than the drive electrode 600 in which the capacitive elements 350 in proximity to the object are formed.

Additionally, by the above-described second condition, the candidates of the capacitive elements 350 to be selected by the selector 223 are narrowed down to the capacitive elements 350 formed in the detection electrodes 400 (the first detection electrode group in the example of FIG. 6) other than the detection electrodes 400 in which the capacitive elements 350 in proximity to the object are formed.

Furthermore, by the above-described third condition, the candidates of the capacitive elements 350 to be selected by the selector 223 are narrowed down to the capacitive elements 350 to which the drive signals with the polarity opposite to that of the capacitive elements 350 in proximity to the object are supplied. In the example of FIG. 6, the positive polarity drive signals are supplied to the drive electrodes indicated by the oblique lines, and the negative polarity drive signals are supplied to the drive electrode without the oblique lines. As the positive drive signals are supplied to the capacitive elements 350 within the region 631 in proximity to the object, the candidates of the capacitive elements 350 to be selected by the selector 223 are narrowed down to the capacitive elements 350 to which the negative polarity drive signals are supplied.

Accordingly, in the example of FIG. 6, the selector 223 selects the six capacitive elements 350 within the region 632 that satisfy all the above-described first condition through third condition, as the electric field generators for which the electric fields are to be adjusted by the controller 224. The controller 224 reduces the electric fields generated by the negative polarity drive signals in the capacitive elements 350 within the region 632 so that the reduced amount of the electric fields generated by the positive polarity drive signals in the capacitive elements 350 within the region 631 to which the object approaches can be balanced. For example, the controller 224 sets the levels of the drive signals supplied to the capacitive elements 350 within the region 632 through the second partial drive electrode 620f and the second partial drive electrode 620g to zero, or reduces the levels of the drive signals to be smaller than usual.

If the levels of the drive signals to be supplied to the capacitive elements 350 within the region 632 through the second partial drive electrode 620f and the second partial drive electrode 620g are set to zero, it can be regarded that the area of the capacitive elements 350 is reduced by the amount corresponding to the second partial drive electrode 620f and the second partial drive electrode 620g. However, the levels of the drive signals of the first partial drive electrode 610f and the first partial drive electrode 610g of the drive electrode 600f and the drive electrode 600g remain to be the negative polarity "−1." Accordingly, in the capacitive elements 350 within the region 632, the levels of the charge signals to be generated are smaller than usual. However, it is possible to detect that the object approaches.

When the above-described sensor main part 370 according to the second example is used, even if the object approaches, the balance of the radiation noise in the vicinity of the input device 100 can be maintained by adjusting the electric fields of the capacitive elements 350 that function as the electric field generators. Furthermore, even if the drive signals of the part of the partial drive electrodes forming the capacitive elements 350 selected as the target of adjustment of the electric fields are set to be approximately zero, the drive signals are supplied to the capacitive elements 350 through the other partial drive electrodes, and, thus, it is possible to detect at the capacitive elements that the object approaches. When the levels of the drive signals are set to zero at the driver 320, the configuration of the driver 320 can be simplified compared to the case where the levels of the drive signals are adjusted in multiple steps.

(Overall Configuration of a Second Embodiment)

Figure 7:
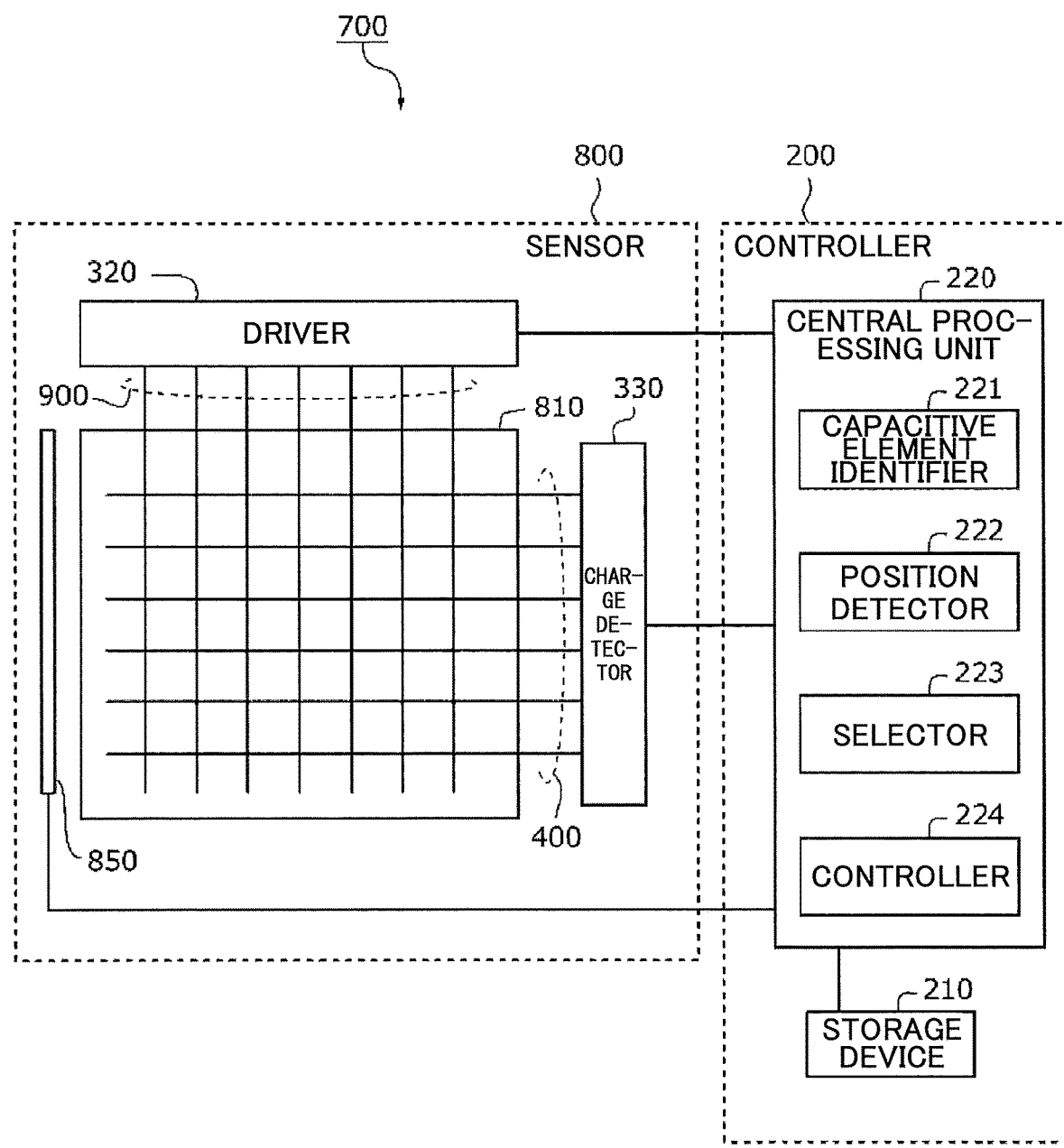
FIG. 7 is a configuration diagram of an input device according to a second embodiment of the present disclosure.

Next, an input device 700 according to a second configuration of the present disclosure is described. As shown in the configuration diagram of FIG. 7, the input device 700 according to the second embodiment is provided with the control unit 200, similar to the first embodiment. However, as described below, a part of the operation of the control unit 200 is different from that of the first embodiment. Instead of the sensor 300 of FIG. 1, the input device 700 is provided with a sensor 800. In the following, as for the input device 700 according to the second embodiment, the difference from the first embodiment is mainly described.

The sensor 800 includes the deriver 320 and the charge detector 330, similar to the sensor 300 according to the first embodiment. The sensor 800 includes a sensor main part 810, instead of the sensor main part 310 of the first embodiment. Additionally, the sensor 800 includes an electric field generator 850 that generates an electric field in accordance with the control of the control unit 200.

Figure 8:
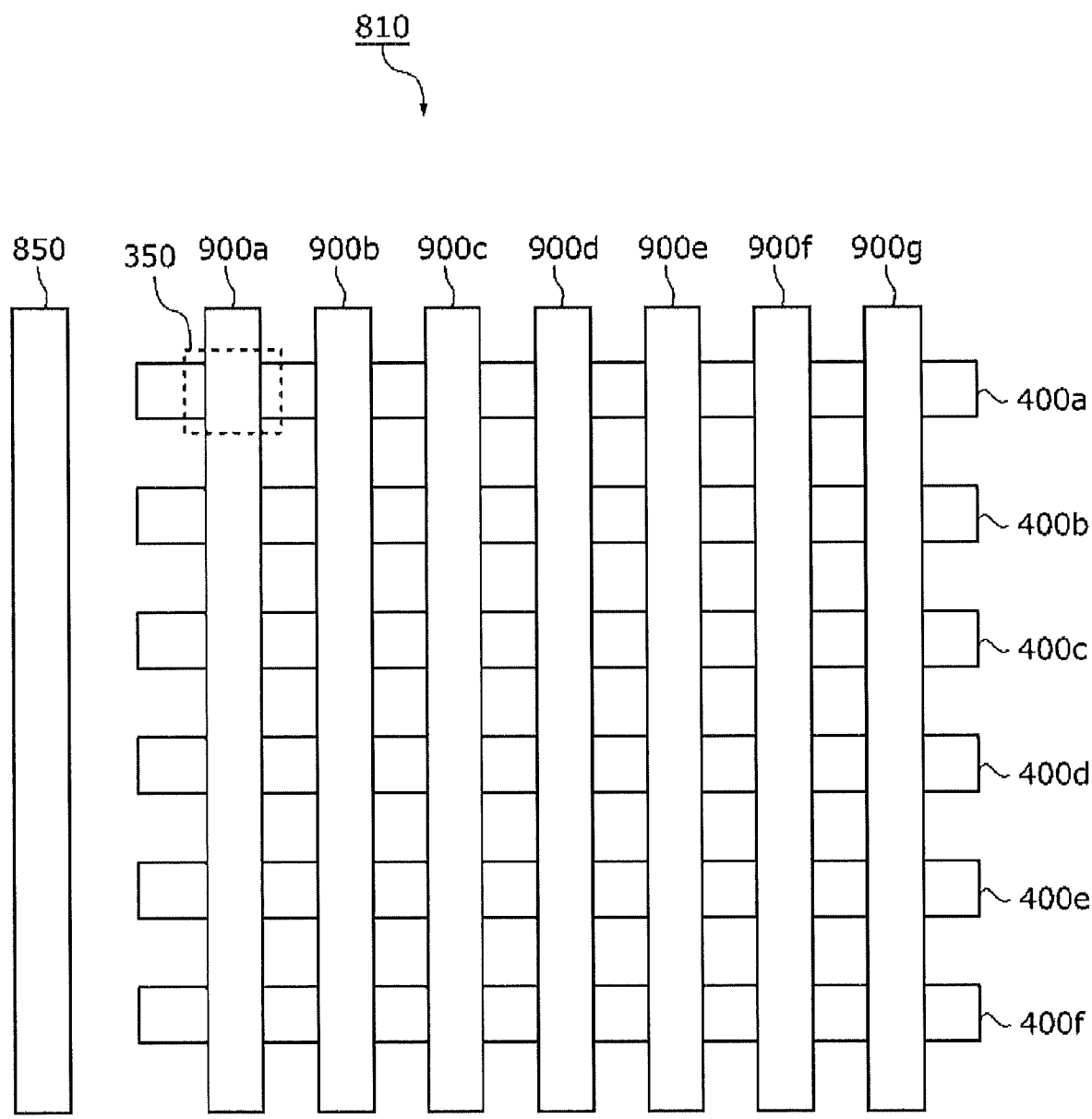
FIG. 8 is a schematic diagram of a sensor main part of the input device illustrated in FIG. 7.

FIG. 8 is a schematic diagram of the sensor main part 810. The sensor main part 810 is provided with seven detection electrodes 400a through 400f, similar to those of the first embodiment, and seven drive electrodes 900a through 900g (which may be referred to as the drive electrodes 900 without distinction). The number of the detection electrodes 400 may be greater than or less than 6; and the number of the drive electrodes 900 may be greater than or less than 7.

To simplify the description, in FIG. 6, the detection electrodes 400 and the drive electrodes 900 are depicted as linear strips with constant width; however, the detection electrodes 400 and the drive electrodes 900 having different shapes may be used. The detection electrodes 400 and the drive electrodes 900 may not orthogonally intersect.

The plurality of detection electrodes 400 is arranged approximately in parallel while evenly spaced apart. The detection electrodes 400a through 400f are arranged in alphabetical order. The plurality of detection electrodes 900 is arranged approximately in parallel while evenly spaced apart. The detection electrodes 900a through 900f are arranged in alphabetical order. Each drive electrode 900 extends to intersect the detection electrodes 400. The number of the drive electrodes 900 that intersect a detection electrode 400 may be different from the number of the drive electrodes 900 that intersect another detection electrode 400.

At an intersection between one drive electrode 900 and one detection electrode 400, a capacitive element 350 is formed.

The electric field generator 850 is, for example, an electrode pattern similar to the drive electrode 900, and a drive signal is supplied from the driver 320 in accordance with the control of the control unit 200.

In the input device 700 according to the embodiment, the capacitive element identifier 221 obtains an electrostatic capacitance detection value of each capacitive element 350 by the 1 hot driving method such that the drive electrodes 900 are sequentially selected one-by-one and the drive signal is supplied. For detecting the electric charges of the plurality of capacitive elements 350 belonging to one detection electrode 400, the capacitive element identifier 221 controls the drive signals of the driver 320 so that the electric charge of one capacitive element 350 is detected by the charge detector 330 at one time. Namely, during one driving, the capacitive element identifier 221 supplies a positive polarity drive signal to one of the drive electrodes 900 of FIG. 8 and does not supply the drive signal to the other drive electrodes 900. In the capacitive elements 350 formed in the drive electrode 900 to which the positive polarity drive signal is supplied, positive polarity charge signals are generated; and, in the capacitive elements 350 formed in the other drive electrodes 900, the charge signal is not generated (the level of the charge signal becomes zero). As a result, the detection signal generated at the charge detector 330 for one detection electrode 400 has a level corresponding to the charge signal generated at one capacitive element 350 connected to the detection electrode 400. By sequentially supplying the drive signals to all the drive electrodes 900, the capacitive element identifier 221 obtains detection signals generated for all the capacitive elements 350 connected to one detection electrode 400. The capacitive element identifier 221 uses the detection signals as the electrostatic capacitance detection values of the capacitive elements 350 and determines the proximity state of the object at each capacitive element 350.

Additionally, in the input device 700 according to the embodiment, the control unit 200 controls the electric field generator 850 so that electric fields for canceling the electric fields generated by the capacitive elements 350 formed in the drive electrodes 900 are generated at a timing that is the same as the timing for supplying the drive signals to the drive electrodes 900.

However, if an object, such as a finger, approaches the drive electrode 900 to which the drive signal is supplied, the electric fields generated by the capacitive elements 350 formed in the drive electrode 900 become small. In this case, the controller 224 controls the electric fields for canceling, which are generated by the electric field generator 850, to be small so as to maintain the balance with the reduced amount of the electric fields caused by the proximity of the object.

In the input device 700 according to the embodiment, the selector 223 can be omitted because it suffices if the electric field generator 850 is controlled so as to adjust the change in the balance of the electric fields caused by the proximity of the object.

(Control Method)

Figure 9:
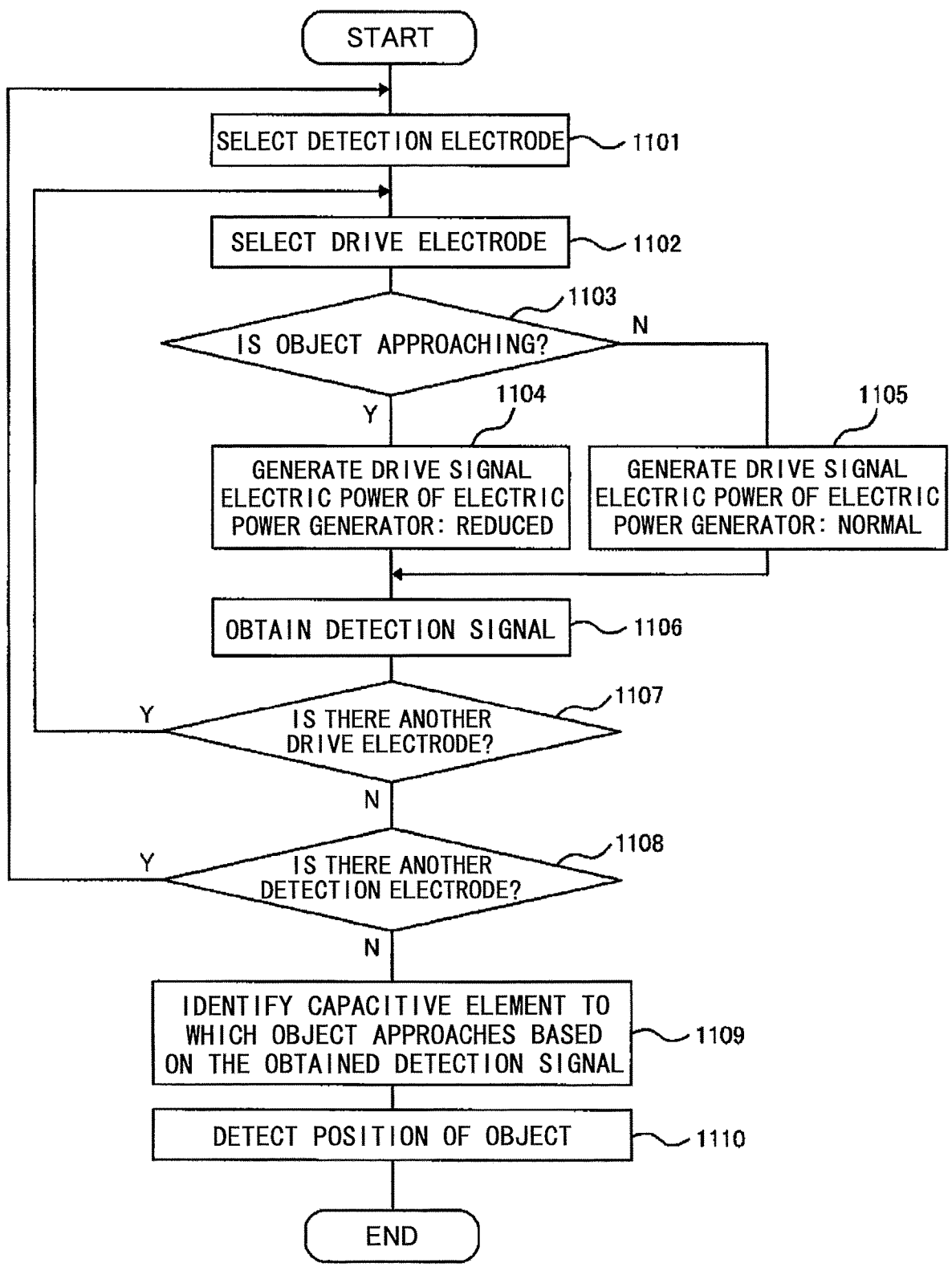
FIG. 9 is a flow chart illustrating an operation of the input device illustrated in FIG. 7.

Next, the method of controlling the input device 700 shown in FIG. 8 is described by referring to the flow chart of FIG. 9. The flow chart of FIG. 9 shows one detection process for detecting the electrostatic capacitance of all the capacitive elements 350 in the sensor main part 810 and detecting the position of the object based on the detection result. The control unit 200 repeatedly executes the process shown in the flow chart of FIG. 9 at predetermined time intervals.

Step 1101:

First, the capacitive element identifier 221 selects, from the plurality of detection electrodes 400, the detection electrode 400 for which the detection signal is to be generated at the charge detector 330.

Step 1102:

Next, the capacitive element identifier 221 selects one drive electrode 900, as a target to which the drive signal is to be supplied.

Step 1103:

The capacitive element identifier 221 determines whether the capacitive element 350 in proximity to the object identified by the previous detection process is included in the capacitive elements 350 formed in the drive electrode 900 selected at step 1102; and if it is included, the process proceeds to step 1104, and if it is not included, the process proceeds to step 1105.

Step 1104:

The capacitive element identifier 221 supplies the positive polarity drive signal to the drive electrode 900 selected at step 1102. Additionally, the control unit 200 causes the electric field generator 850 to generate the electric field for canceling at the same timing as the supply of the drive signal. However, the control unit 200 causes the electric field generated by the electric field generator 850 to be lower than usual by the control of the controller 224. For example, the controller 224 reduces the level of the drive signal supplied from the driver 320 to the electric field generator 850. Alternatively, the controller 224 may cause the electric field generated by the electric field generator 850 to be zero by setting the level of the drive signal to be supplied to the electric field generator 850 to be zero.

Step 1105:

The capacitive element identifier 221 supplies the positive polarity drive signal to the drive electrode 900 selected at step 1102. Further, the control unit 200 causes the electric field generator 850 to generate the electric field for canceling, at the same timing as the supply of the drive signal. In this case, the controller does not adjust the electric field generated by the electric field generator 850, and, thus, the electric field generator 850 generates the electric field with a usual level.

Step 1106:

After the drive signal is supplied to one drive electrode 900 at step 1104 or 1105, the charge detector 330 generates a detection signal corresponding to a charge signal generated at one capacitive element 350 of the detection electrode 400 selected at step 1101. The capacitive element identifier 221 obtains the detection signal generated at the charge detector 330 and stores it in the storage device 210.

Step 1107:

After obtaining the detection signal at step 1106, if there exists another drive electrode 900 to which the drive signal is not supplied yet, the capacitive element identifier 221 returns to step 1102 and repeats the process on and after step 1102.

Step 1108:

After completing the process of steps 1102 through 1107 for all the drive electrodes 900, if there exists the detection electrode 400 for which the detection signal is not obtained yet, the capacitive element identifier 221 returns to step 1101 and repeats the process on and after step 1101.

Step 1109:

After completing the process of steps 1101 through 1108 for all the detection electrode 400, the capacitive element identifier 221 determines the proximity state of the object at each capacitive element 350 based on the detection signal (the electrostatic capacitance detection value) of each capacitive element 350 obtained from the detection electrode 400. The capacitive element identifier 221 calculates, for each capacitive element 350, the difference between the detection signal (the electrostatic capacitance detection value) and the base value, and determines, for each capacitive element 35, whether the object approaches by comparing the calculated difference with the threshold value. The capacitive element identifier 221 applies a predetermined filtering process to the determination result of the proximate state of the object by the threshold value and identifies a region (a group of the capacitive elements 350) to which the object approaches.

Step 1110:

The position detector 222 calculates the coordinates of the position to which the object approaches based on the group of the capacitive elements 350 for which the determination is made by the capacitive element identifier 221 that the object approaches.

According to this embodiment, by adjusting the electric field using the electric field generator 850, the balance of the radiation noise in the vicinity of the input device 100 can be maintained, even if an object approaches. Furthermore, as the electric field generator 850 is provided separately from the capacitive elements 350, the proximity of an object can be accurately detected by all the capacitive elements 350 while maintaining the balance of the radiation noise.

The input device, the control method for the input device, and a non-transitory storage medium storing the input device control program are described by the embodiments. However, the present invention is not limited to the above-described embodiments. Namely, a parson ordinarily skilled in the art may make various changes, combinations, sun-combinations, and substitutions for the components of the above-described embodiments within the technical scope or the scope of equivalence of the present invention.

The present invention can be applied to various types of input devices for inputting information depending on proximity of an object using a change in electrostatic capacity.

What is claimed is:

1. An input device for inputting information corresponding to approach of an object, the input device comprising:
    a plurality of capacitive elements configured such that, for each of the plurality of capacitive elements, electrostatic capacitance changes in response to approach of an object;
    a driver that supplies drive signals to the plurality of capacitive elements, respectively;
    a charge detector that detects a change in an electric charge corresponding to the drive signal in each of the plurality of capacitive elements;
    a capacitive element identifier that identifies a specific capacitive element of the plurality of capacitive elements to which the object approaches based on a detection result by the charge detector;
    an electric field generator that generates an electric field for reducing another electric field generated as an electric charge changes in at least in one capacitive element when the driver supplies the drive signal to the at least one capacitive element; and
    a controller that adjusts the electric field generated by the electric field generator depending on whether the at least one capacitive element to which the driver supplies the drive signal includes the specific capacitive element identified by the capacitive element identifier.

2. The input device according to claim 1, further comprising:
    a selector that selects, as the electric field generator for which the electric field is to be adjusted by the controller, at least one capacitive element of the plurality of capacitive elements that is different from the specific capacitive element identified by the capacitive element identifier, if the plurality of capacitive elements includes the specific capacitive element identified by the capacitive element identifier when the driver supplies the drive signals to the plurality of capacitive elements,
    wherein the controller adjusts a charge amount, which varies as the drive signal is supplied, of the capacitive element in a state in which the object does not approach that is different from the specific capacitive element identified by the capacitive element identifier, depending on whether the selector selects the capacitive element in the state in which the object does not approach.

3. The input device according to claim 2, wherein the driver is capable of changing a polarity of the change in the electric charge in the capacitive element, depending on the drive signal,
    wherein the selector selects, as the electric field generator for which the electric field is to be adjusted by the controller, at least one capacitive element in the state in which the object does not approach and the electric charge varies in a polarity opposite to a polarity of the specific capacitive element identified by the capacitive element identifier, and
    wherein, when the selector selects the capacitive element in the state in which the object does not approach, the controller causes the charge amount in the capacitive element in the state in which the object does not approach, which varies as the drive signal is supplied, to be smaller, compared to a case in which the selector does not select the capacitive element in the state in which the object does not approach.

4. The input device according to claim 2, wherein the controller adjusts at least one of the electrostatic capacitance of the capacitive element in the state in which the object does not approach and a level of the drive signal supplied to the capacitive element in the state in which the object does not approach, depending on whether the selector selects the capacitive element in the state in which the object does not approach.

5. The input device according to claim 1, further comprising:
a plurality of detection electrodes; and
a plurality of drive electrodes that intersects the plurality of detection electrodes,
wherein each capacitive element is formed at an intersection between one detection electrode and one drive electrode,
wherein the driver supplies the drive signals to the plurality of drive electrodes, respectively,
wherein the charge detector generates, for each of the plurality of detection electrodes, a detection signal corresponding to a sum of changes in the electric charges in the plurality of capacitive elements formed in a common detection electrode,
wherein the capacitive element identifier identifies the specific capacitive element to which the object approaches, based on the plurality of detection signals generated for the plurality of detection electrodes in the charge detector,
wherein, when the driver supplies the drive signal to at least one drive electrode, the electric field generator generates an electric field for reducing an electric field that occurs with the changes in the electric charges in the plurality of capacitive elements formed in the at least one drive electrode, and
wherein the controller adjusts the electric field generated by the electric field generator depending on whether the plurality of capacitive elements formed in the at least one drive electrode to which the driver supplies the drive signal includes the specific capacitive element identified by the capacitive element identifier.

6. The input device according to claim 5, further comprising:
a selector that select, as the electric field generator for which the electric field is to be adjusted by the controller, at least one capacitive element that is formed in the drive electrode that is different from the drive electrode in which the specific capacitive element of the plurality of capacitive elements identified by the capacitive element identifier is formed and that is formed in the detection electrode that is different from the detection electrode in which the specific capacitive element identified by the capacitive element identifier is formed, if the plurality of capacitive elements formed in the plurality of drive electrodes includes the specific capacitive element identified by the capacitive element identifier when the driver supplies the drive signals to the plurality of drive electrodes,
wherein the controller adjusts the charge amount that varies as the drive signal is supplied in the capacitive element in the state in which the object does not approach that is the capacitive element that is different from the specific capacitive element identified by the capacitive element identifier, depending on whether the selector selects the capacitive element in the state in which the object does not approach.

7. The input device according to claim 6, wherein each drive electrode is divided into a plurality of partial drive electrodes,
wherein the driver is capable of supplying the drive signal to each partial drive electrode,
wherein the controller supplies a common drive signal to the plurality of partial drive electrodes for the drive electrode in which the capacitive element selected by the selector is not formed, and
wherein the controller supplies different drive signals to a part of the plurality of partial drive electrodes that forms the selected capacitive element and to another part of the partial drive electrodes, respectively, for the drive electrode in which the capacitive element selected by the selector is formed.

8. The input device according to claim 7, wherein the driver is capable of changing the polarity of the change in the electric charge in the capacitive element, depending on the drive signal,
wherein the selector selects, as the electric field generator for which the electric field is to be adjusted by the controller, at least one capacitive element in the state in which the object does not approach that is formed in the drive electrode that is different from the drive element in which the specific capacitive element identified by the capacitive element identifier is formed; that is formed in the detection electrode that is different from the detection electrode in which the specific capacitive element identified by the capacitive element identifier is formed; and for which the electric charge varies in a polarity opposite to that of the specific capacitive element identified by the capacitive element identifier, and
wherein the controller causes a level of the drive signal supplied to the part of the partial drive electrodes of the plurality of partial drive electrodes that forms the selected capacitive element to be smaller than that of the drive signal supplied to the other part of the partial drive electrodes, for the drive electrode in which the capacitive element selected by the selector is formed.

9. The input device according to claim 7, wherein each of the one or more capacitive elements are formed by two or more of the partial drive electrodes.

10. The input device according to claim 9, wherein the controller causes the level of the drive signal to be supplied to the one or more partial drive electrodes forming the capacitive element selected by the selector to be approximately zero when the at least one of the capacitive element selected by the selector is the capacitive element formed by the two or more of the partial drive electrodes.

11. The input device according to claim 5, wherein the driver is capable of selecting, as the polarity of the drive signal, causing the drive signal to have a signal level with a predetermined absolute value for accumulating a positive polarity charge in the capacitive element; causing the drive signal to have the signal level with a predetermined absolute value for accumulating a negative polarity charge in the capacitive element; and causing the level of the drive signal to be zero,
wherein the charge detector generates the detection signal corresponding to the sum of the electric charge signals generated as the drive signal is supplied to each of the plurality of capacitive elements formed in the detection electrode, and
wherein the capacitive element identifier obtains, while changing the polarity pattern that is a combination of the polarities in the plurality of drive signals simultaneously supplied to the plurality of drive electrode into a plurality of patterns, the detection signals of the identical detection electrode generated, for each of the polarity patterns, by the charge detector; and the capacitive element identifier calculates, based on the plurality of polarity patterns and the detection signals obtained in a number that is the same as that of the polarity patterns for one of the detection electrodes, electrostatic capacitance detection values of the plurality of capacitive elements formed in the one detection electrode.

12. The input device according to claim 5, wherein, for detecting the electric charges of a plurality of capacitive elements belonging to one detection electrode, the capacitive element identifier controls the drive signal so that the electric charge of one capacitive element of the plurality of capacitive elements belonging to the one detection electrode is detected by the charge detector at one time.

13. A control method for an input device for inputting information corresponding to approach of an object, the input device including
a plurality of capacitive elements such that, for each of the plurality of capacitive elements, electrostatic capacitance changes in response to approach of an object;
a driver that supplies drive signals to the plurality of capacitive elements, respectively;
a charge detector that detects a change in an electric charge corresponding to the drive signal in each of the plurality of capacitive elements; and
an electric field generator that generates an electric field for reducing another electric field generated as an electric charge changes in at least in one capacitive element when the driver supplies the drive signal to the at least one capacitive element,
wherein the control method comprises:
identifying a specific capacitive element of the plurality of capacitive elements to which the object approaches based on a detection result by the charge detector; and
adjusting the electric field generated by the electric field generator depending on whether the at least one capacitive element to which the driver supplies the drive signal includes the identified specific capacitive element.

14. A non-transitory computer readable storage medium storing an input device control program that causes a computer to execute a control method for the input device for inputting information corresponding to approach of an object, the input device including
a plurality of capacitive elements such that, for each of the plurality of capacitive elements, electrostatic capacitance changes in response to approach of an object;
a driver that supplies drive signals to the plurality of capacitive elements, respectively;
a charge detector that detects a change in an electric charge corresponding to the drive signal in each of the plurality of capacitive elements; and
an electric field generator that generates an electric field for reducing another electric field generated as an electric charge changes in at least in one capacitive element when the driver supplies the drive signal to the at least one capacitive element,
wherein the control method comprises:
identifying a specific capacitive element of the plurality of capacitive elements to which the object approaches based on a detection result by the charge detector; and
adjusting the electric field generated by the electric field generator depending on whether the at least one capacitive element to which the driver supplies the drive signal includes the identified specific capacitive element.

* * * * *